Figure 4:
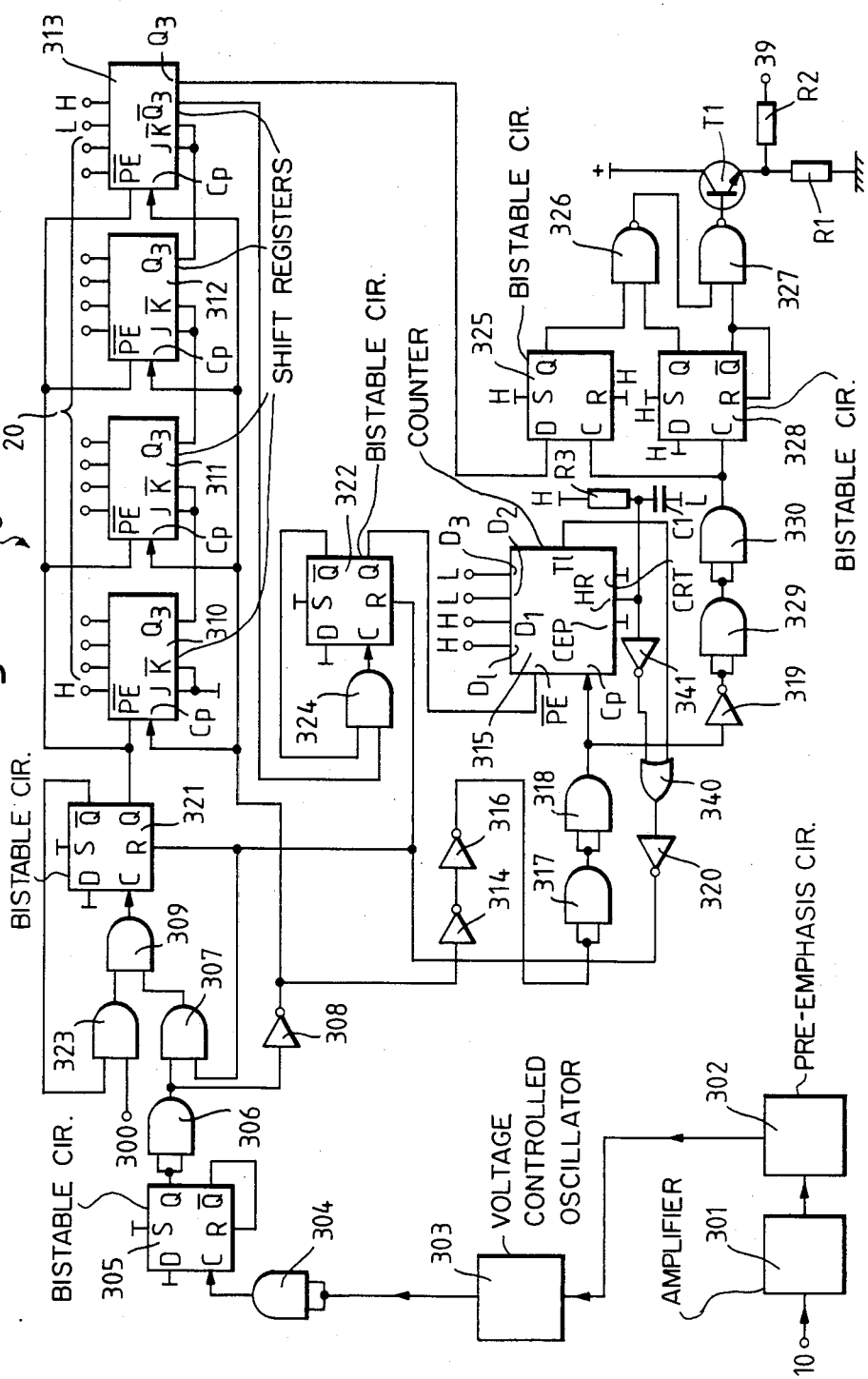

United States Patent [19]

Andrew et al.

[11] Patent Number: 4,723,237
[45] Date of Patent: Feb. 2, 1988

[54] SIGNAL TRANSMISSION ARRANGMENT, A TRANSMITTER AND A RECEIVER FOR SUCH AN ARRANGEMENT AND A COMMUNICATION SYSTEM INCLUDING SUCH AN ARRANGEMENT

[75] Inventors: Derek Andrew, Charlwood; Michael D. James, Crawley Down, both of England

[73] Assignee: U.S. Philips Corporation, New York, N.Y.

[21] Appl. No.: 860,381

[22] Filed: May 6, 1986

[30] Foreign Application Priority Data

May 10, 1985 [GB] United Kingdom ............... 8511955

[51] Int. Cl.4 .......................... H04J 9/00; H04L 5/04
[52] U.S. Cl. ...................................... 370/11; 370/119
[58] Field of Search ................. 370/9, 11, 110.4, 8, 370/119; 375/22

[56] References Cited

U.S. PATENT DOCUMENTS

| | | | |
|---|---|---|---|
| 2,583,484 | 1/1952 | Guanella et al. | 370/12 |
| 3,178,515 | 4/1965 | Bramer et al. | 370/11 |
| 3,623,105 | 11/1971 | Kamen et al. | 370/11 |
| 3,715,510 | 2/1973 | Birnbaum et al. | 370/11 |
| 3,862,363 | 1/1975 | Tanimoto | 370/9 |
| 4,677,608 | 6/1987 | Forsberg | 370/11 |

FOREIGN PATENT DOCUMENTS

| | | | |
|---|---|---|---|
| 3248670 | 2/1966 | Japan | 375/22 |
| 0024840 | 3/1981 | Japan | 370/11 |

Primary Examiner—Robert L. Griffin
Assistant Examiner—Melvin Marcelo
Attorney, Agent, or Firm—Thomas A. Briody; William J. Streeter; Gregory P. Gadson

[57] ABSTRACT

A communication system comprises a plurality of subscriber stations (51-1 to 51-n) each of which comprise a transmitter (3) and a receiver (4). A switching network comprising a selection switch (57) and a synchronous digital switching network (60) is connected to the subscriber stations (51-1 to 51-n) via separating and combining circuits (52-1 to 52-n) each of which comprise a transmitter (3) a receiver(4) and an interface unit (55). The transmitter (3) transmits a signal comprising a square wave frequency modulated signals which is modulated by a wideband (video) signal, on transitions of which short or long pulses are initiated in response to a data signal. The wideband and data signals are separated in the separating and combining circuits (52-1 to 52 -n) to enable the wideband and data signals to be separately processed in the switching networks (57,60).

10 Claims, 18 Drawing Figures

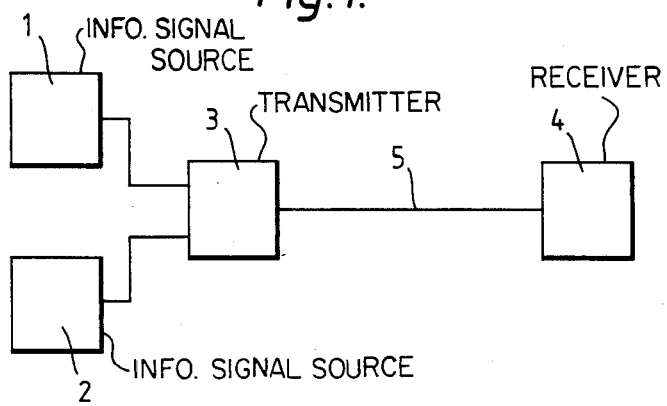
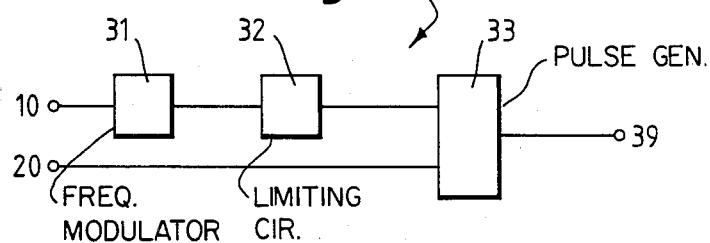
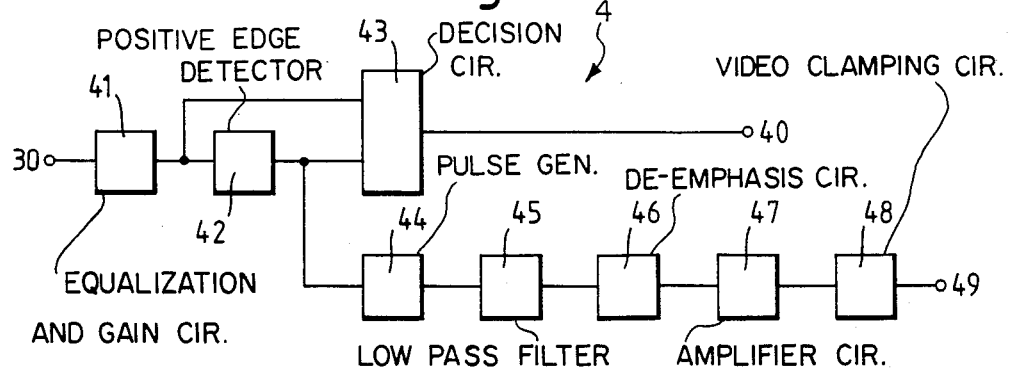

SIGNAL TRANSMISSION ARRANGMENT, A TRANSMITTER AND A RECEIVER FOR SUCH AN ARRANGEMENT AND A COMMUNICATION SYSTEM INCLUDING SUCH AN ARRANGEMENT

BACKGROUND OF THE INVENTION

The invention relates to an arrangement for transmitting a first information signal over a signal transmission path, the arrangement comprising a transmitter and a receiver, the transmitter comprising means for frequency modulating a carrier signal by the first information signal and means for amplitude limiting the frequency modulated carrier signal so that the information content of the frequency modulated signal is contained solely in the transition times of the frequency modulated carrier signal and the receiver comprising means for demodulating the frequency modulated carrier signal to recover the first information signal. The invention further relates to a transmitter and to a receiver for use in such an arrangement. The invention still further relates to a communication system including such an arrangement.

Such an arrangement is disclosed in U.K. Patent Application No. 2093664 (PHB 32759). The provision of broadband communication networks for business houses or local communities is attracting increasing attention. Until recently networks carrying telephone services were all that existed. Now, digital data services are becoming increasingly common and a variety of local area networks (LAN's) are available. Additionally the public networks are adopting the integrated services digital network (ISDN) concepts, with the introduction of digital switches.

It is likely that in the future there will be a demand for the addition of a full television capability to the local network. Thus, there will be a requirement for the distribution of television signals as well as person to person switched services such as telephone, video phone and data services. The addition of television services will require an increased bandwidth in the transmission links. If a star configuration network is adopted for two-way switched video applications then the links will be required to carry one or more video channels in each direction plus all the data and voice services. The lengths of the transmission links may vary from a few meters for small LANs to several kilometers for local community networks.

Proposals have been made for a fully digital broadband network with bit rates of up to 140 Mbits for the transmission of video signals. The data, voice and video signals would be multiplexed together for transmission over optical fiber to the central switching point. Such a system is expensive to implement since the switching matrix has to operate at clock frequencies of around 140 MHz. Synchronization of the entire network is necessary to implement the multiplexers and demultiplexers and to enable the use of efficient switching networks employing re-arrangeable routing. While it would be possible to implement such arrangements by means of LSI circuits at clock rates of 2 MHz this option is not presently available at clock rates of 140 MHz because of difficulties with power consumption at those frequencies. Consequently a fully digital broadband network with bit rates of 140 Mbit/sec would be expensive to construct with current technology.

SUMARY OF THE INVENTION

It is an object of the invention to enable the provision of wideband signal transmission and switching systems having the possibility of offering television, voice and data services which is less expensive that the 140 MHz synchronized system discussed hereinbefore.

The invention provides an arrangement for transmitting a first information signal over a signal transmission path, the arrangement comprising a transmitter and a receiver, the transmitter comprising means for frequency modulating a carrier signal by the first information signal and means for amplitude limiting the frequency modulated carrier signal so that the information content of the frequency modulated signal is contained solely in the transition times of the frequency modulated carrier signal and the receiver comprising means for demodulating the frequency modulated carrier signal to recover the first information signal, characterized in that the transmitter comprises means for further modulating the frequency modulated carrier signal by a second information signal, the further modulation comprising a train of pulses, the duration of individual pulses of the pulse train being dependent on the second information signal and the leading edge of each pulse being coincident with a transition of said frequency modulated carrier signal, and in that the receiver comprises means for demodulating the further modulation to recover the second information signal.

Frequency modulation of the wide band (for example television signal) enables the bit rate required to be reduced and avoids the need for network synchronization of the frequency modulated signal. The invention is based on the recognition that additional data and voice channels can be added to the amplitude limited frequency modulated carrier signal by a technique similar to pulse width modulation.

The leading edges of successive pulses may be coincident with alternate transitions of the frequency modulated carrier signal.

It is known that a sinusoidal carrier with radian frequency $w_c$ can be frequency modulated by a sinusoidal signal $w_s$ to provide a frequency modulated carrier wave which has zero crossings given by the solutions to $$w_c t + m \sin w_s t = \pm n\pi \quad (1)$$

where m is the modulation index and is defined as the maximum excursion of the carrier frequency divided by the bandwidth of the modulating signal and n is an integer.

It is known that the original signal $w_s t$ can be recovered from the zero crossings by means of a zero crossing detector which produces a pulse having a constant amplitude and duration at each zero crossing and a low pass filter which filters the output of the zero crossing detector. If each alternate zero crossing only is considered then these alternate zero crossing occur when $$(w_c/2)t + (m/2) \sin w_s t = \pm n\pi \quad (2).$$

The only difference between the arrangements represented by equations (1) and (2) is that the signal recovered from the zero crossings represented by equation (2) is reduced in amplitude relative to that represented by equation (1) by a factor of two and the signal to noise ratio, dependent on the square of the modulation index, is reduced by a factor of four. This principle can be extended to higher frequency division factors i.e. every fourth, eighth, etc zero crossing.

By transmitting a pulse whose duration is dependent on the instantaneous value of the second information signal and which commences at the instant of appropriate transitions of the frequency modulated carrier signal a further information channel can be provided.

It should be noted that if the variable duration pulses are transmitted on every edge rather than only on alternate edges the bandwidth required to transmit these pulses requires a receiver bandwidth which cannot be achieved with currently available standard CMOS integrated circuits. By reducing the effective frequency it becomes possible to detect the data pulses at the receiver using currently available CMOS logic families. This is assuming an FM carrier frequency of 25 MHz and a peak deviation of 7.2 MHz.

The second information signal may be encoded in binary form, the train of pulses comprising short pulses representing one binary state and long pulses representing the other binary state, the duration of the long pulses being less than the period between two successive transitions of the highest frequency of the frequency modulated carrier signal and the start of each pulse coinciding with a transition of the frequency modulated carrier signal.

The first information signal may be a wideband analogue signal which may be a video signal.

The invention further provides a transmitter comprising means for frequency modulating a carrier signal by the first information signal and means for amplitude limiting the frequency modulated carrier signal so that the information content of the frequency modulated carrier signal is contained solely in the transition times of the frequency modulated carrier signal, characterized in that the transmitter further comprises means for further modulating the frequency modulated carrier signal by a second information signal the further modulation comprising a train of pulses, the duration of individual pulses of the pulse train being dependent on the second information signal and the leading edge of each pulse being coincident with a transition of said frequency modulated carrier signal.

The transmitter may comprise means for assembling data into n-bit data words for transmission, where n is an integer. Each bit of the data word may be derived from a different data source. The data assembling means may comprise a shift register having parallel load inputs and a serial output.

This provides a convenient arrangement for assembling data from a number of sources, which need not be operating at the same data rate and which may be synchronous or asynchronous, prior to transmission of the data. Asynchronous data may be transmitted provided that the word rate, which will normally be synchronized with a digital switch if the arrangement is part of a switched communication system, is sufficiently high that oversampling at a sufficient rate occurs. There will be some jitter on the edges but this effect will be small due to the high carrier frequency.

The transmitter may include synchronizing means for controlling the transmission of data words synchronously with an applied clock signal.

This enables the arrangement to be used in a switched communications system having a synchronous switching network.

The invention still further provides a receiver comprising means for demodulating the frequency modulated carrier signal to recover the first information signal characterised in that the receiver further comprises means for demodulating the further modulation to recover the second information signal.

The further means may comprise an edge detector which produces a pulse at alternate transitions of the input signal, the leading edge of the pulse being delayed by a period which is intermediate the durations of the short and long pulses transmitted and a decision circuit which detects the presence or absence of a pulse at the leading edge of the delayed pulse.

This provides a simple arrangement for recovering the second information signal when it is in binary form and modulates the frequency modulated carrier signal by adding a short or long pulse, depending on the binary state to be transmitted, at each transition of the frequency modulated carrier signal.

The edge detector and the decision circuit may be both formed as D type bistable circuits.

This enables the provision of a simple and inexpensive demodulator for the second information signal enabling the use of standard integrated circuits and is suitable for incorporating in a large scale integrated circuit.

The means for demodulating the frequency modulated carrier signal may comprise a pulse generator which generates a pulse of constant amplitude and duration at each detected transition of the frequency modulated signal and a low pass filter which filters the output from the pulse generator, the pulse generator being triggered by the output of the edge detector.

The receiver may comprise means for receiving n-bit data words, where n is an integer and for providing separate outputs for each bit of the data word. Each received data word may be entered into a shift register having a serial input and a parallel output.

This provides a simple arrangement for serving a number of peripheral devices at a subscriber station giving independent data channels which may be allocated separately to any peripheral device or may be combined at one peripheral device to provide a faster data transmission rate.

The invention yet further provides a communication system comprising a plurality of subscriber stations and means for transmitting signals to and/or from each of the subscriber stations to a switching network for interconnecting the subscriber stations, wherein each subscriber station comprises a transmitter and/or a receiver, characterized in that each transmitter comprises means for frequency modulating a carrier signal by a first information signal and means amplitude limiting the frequency modulated carrier signal so that the information content of the frequency modulated signal is contained solely in the transition times of the frequency modulated carrier signal and means for further modulating the frequency modulated carrier signal by a second information signal the further modulation comprising a train of pulses the duration of individual pulses of the pulse train being dependent on the second information signal and the start of each pulse being coincident with a transition of said frequency modulated carrier signal, that each receiver comprises means for demodulating the frequency modulated carrier signal to recover the first information signal and means for demodulating the further modulation to recover the second information signal, and that the switching network comprises input means for receiving the signal from each of the subscriber stations and separating the first and the second information signals, the separating means having a first output for the second information signal and the second output for the square wave frequency modulated signal with the further modulation removed, means for connecting the first output of the separating means to a synchronous digital switching network, means for connecting the second output of the separating means to a selection or selection and distribution switching network and output means for combining the square wave frequency modulated signal and the second information signal, the combining means having a first input for receiving the square wave frequency modulated signal from the selection or selection and distribution network, a second input for receiving the second information signal and an output at which the square wave frequency modulated signal further modulated by the second information signal is produced.

The input means may comprise means for producing a square wave signal whose transitions correspond to the leading edges of the received pulse train, means for feeding the square wave signal to the second output of the input means, means for demodulating the further modulation to recover the second information signal and means for feeding the second information signal to the first output of the input means. The input means may further comprise means for deriving a clock signal from the received pulse train.

The output means may comprise means for adding a pulse to each transition of the square wave frequency modulated signal received at its first input, the length of the pulse being dependent on the state of the data signal applied to its second input, and means for feeding the combined signal to the output of the output means.

This enables the provision of a switched communications system in which the wideband information signal which does not need to be synchronized is separated from the lower frequency data signal at the switching network so that the switching network can be constructed in two parts, i.e. an asynchronous switching network for the wideband signal and a synchronous switch for the lower frequency data signals. Thus video signals can be transmitted without needing a switching rate of 140 MHz to digitally encode the video signal and also the video part of the network does not require overall synchronization. Consequently the selection and distribution switching arrangement can be constructed using currently available CMOS integrated circuits and is thus suitable for construction with large scale integrated circuits.

The input means at the switch may be provided for each connected subscriber station having a transmitter and the output means at the switch may be provided for each connected subscriber station having a receiver.

The output means may comprise a transmitter including synchronizing means for controlling the transmission of data words synchronously with an applied clock, the applied clock signal being derived from the digital switch network clock. At a subscriber station comprising a receiver and a transmitter the clock signal for the second information signal may be derived from a clock signal recovered from the second information signal received by the receiver.

This enables overall system synchronization of the data channels independently of the FM signal modulated by the first information signal source.

BRIEF DESCRIPTION OF THE INVENTION

Figure 6:
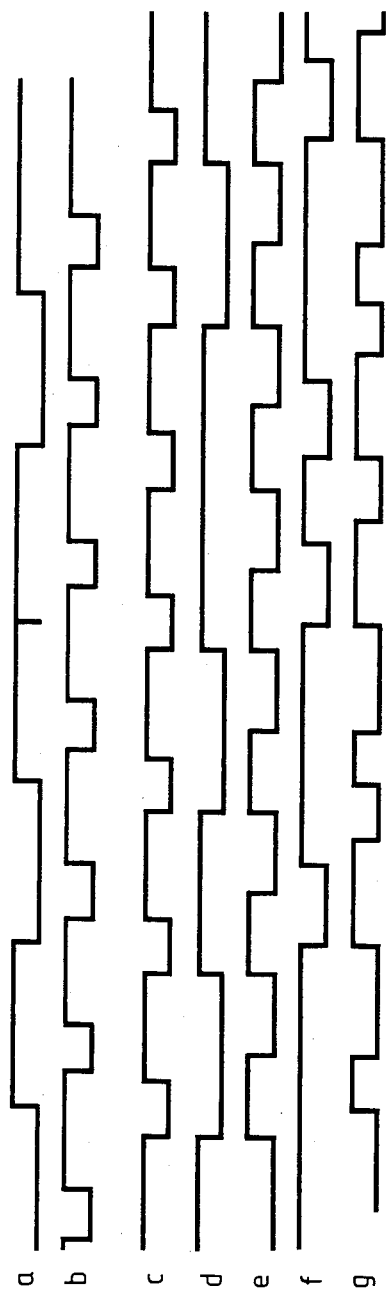
Figure 7:
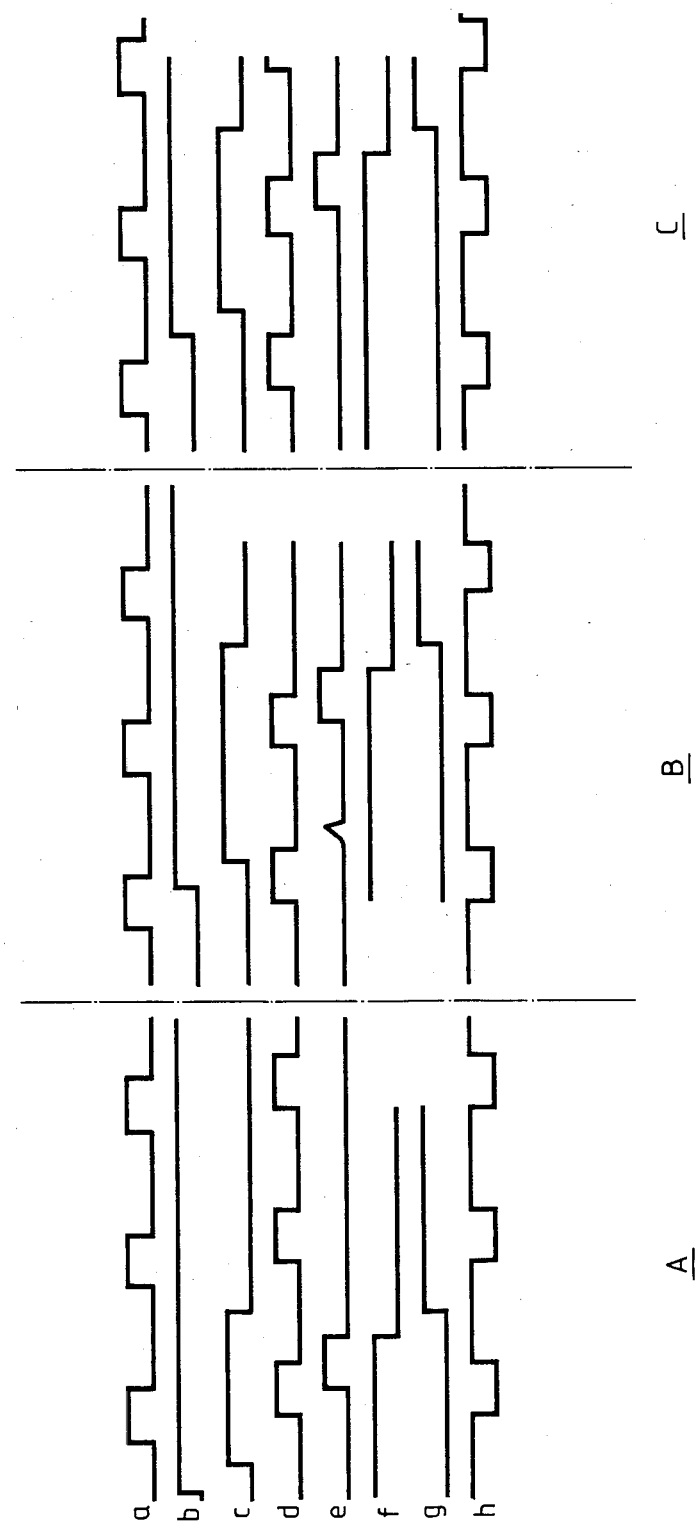
Figure 8:
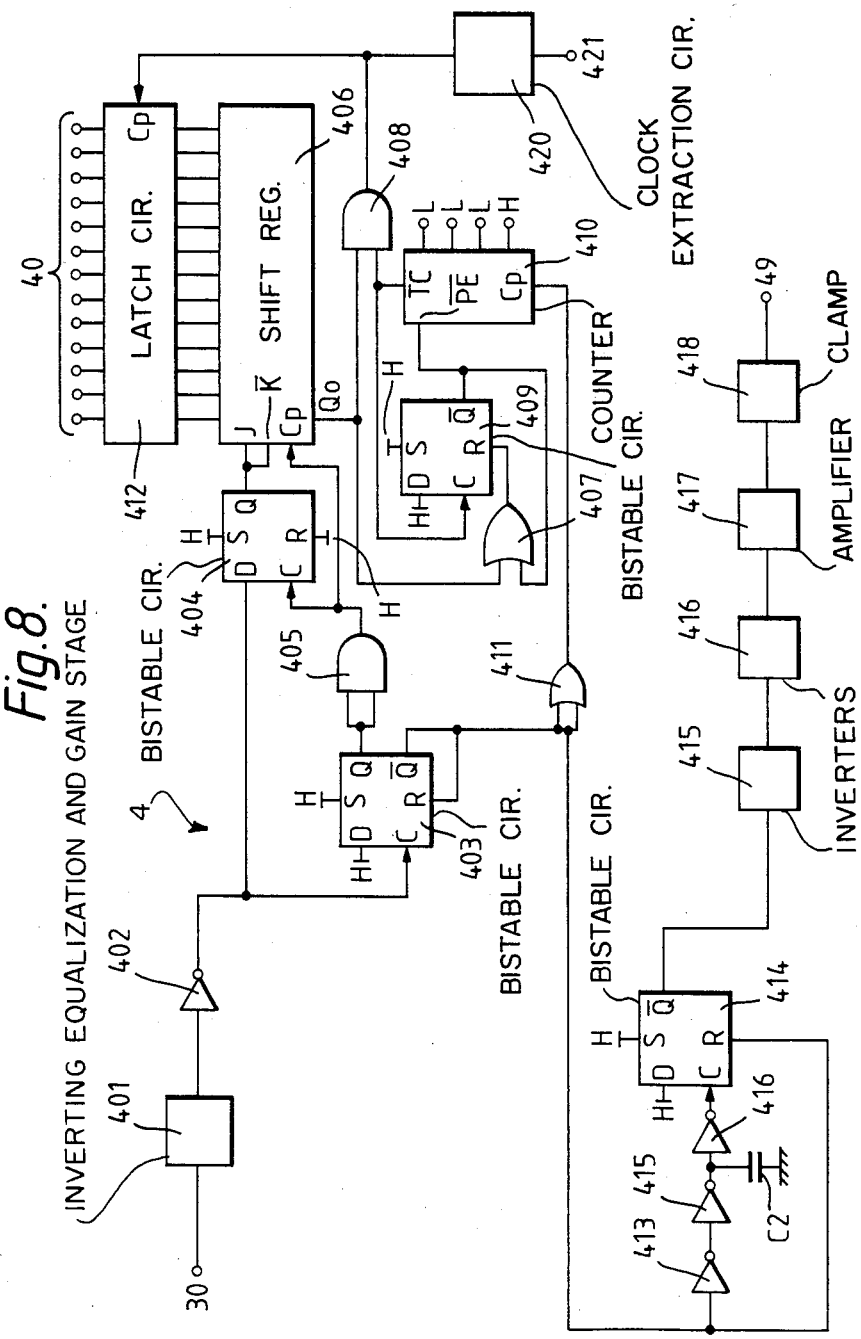
Figure 9:
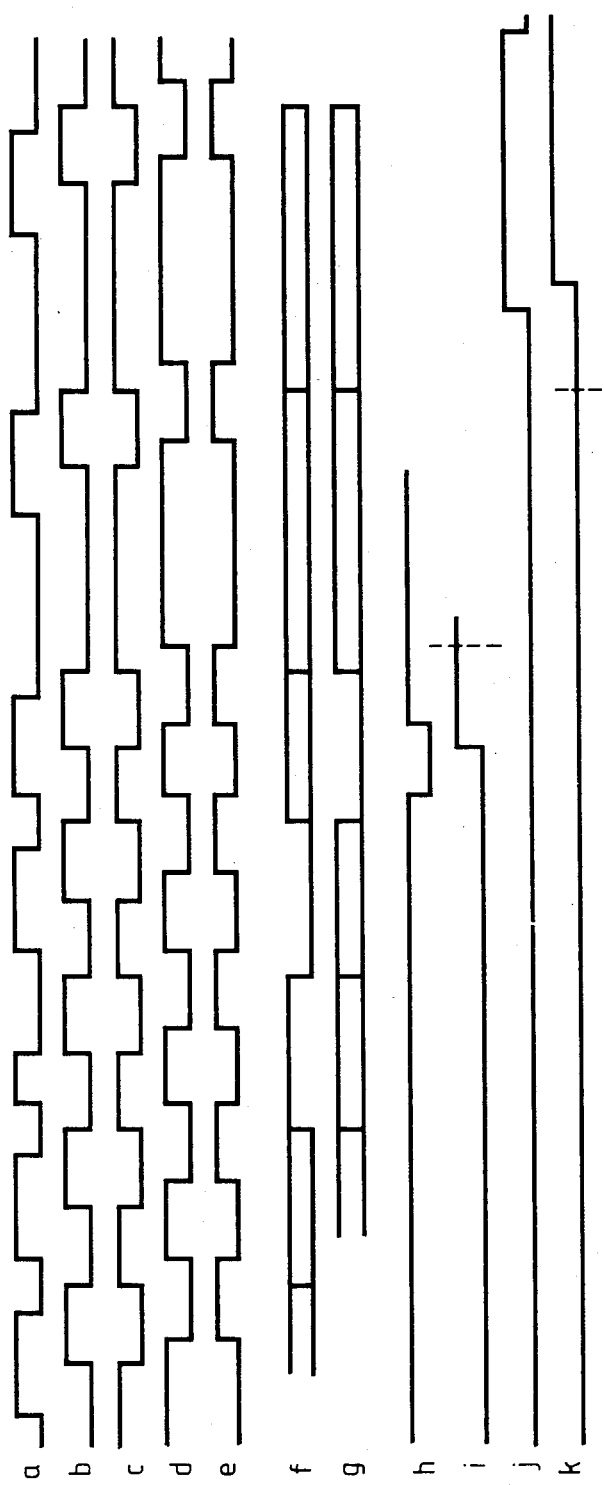
Figure 10:
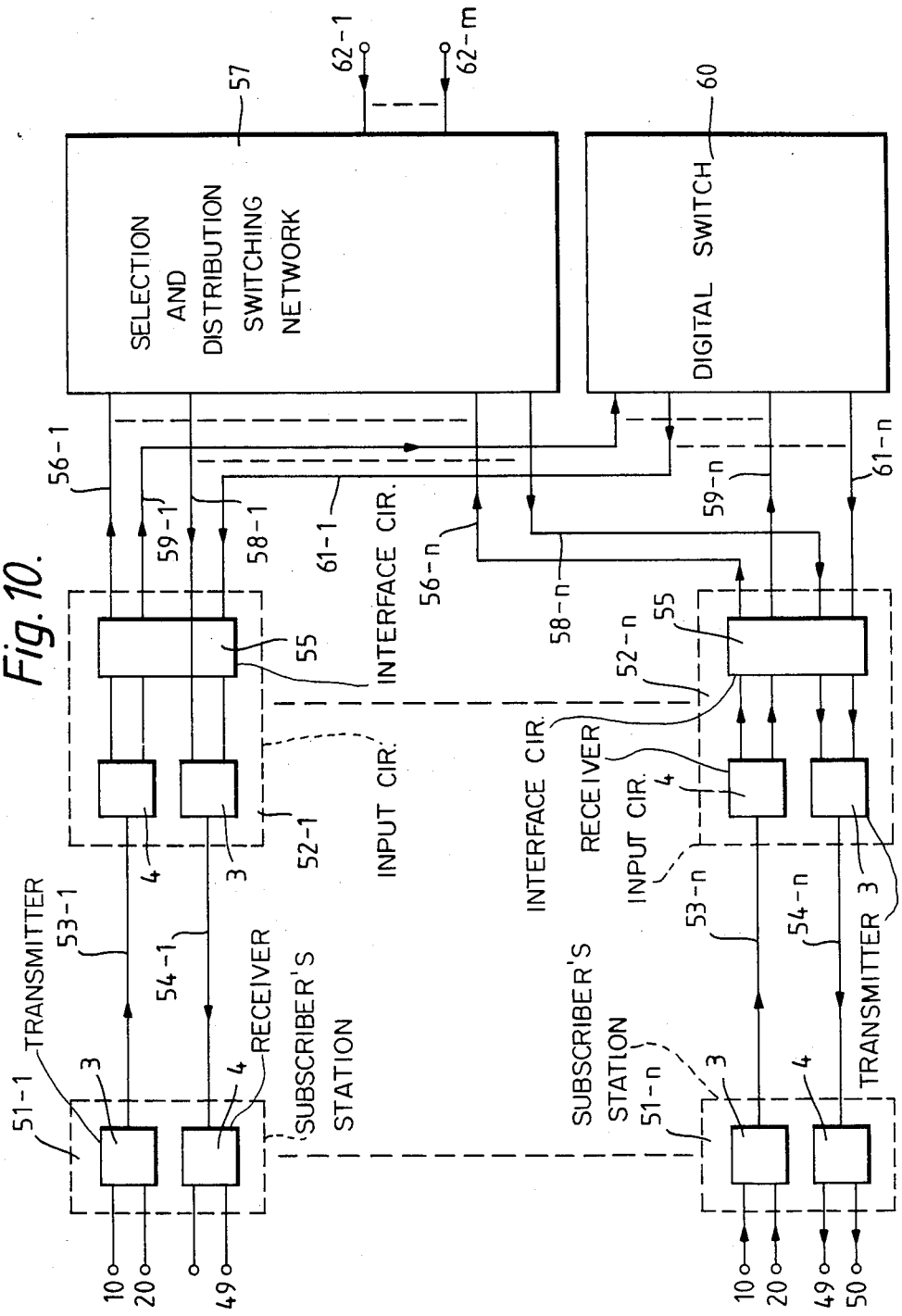
Figure 11:
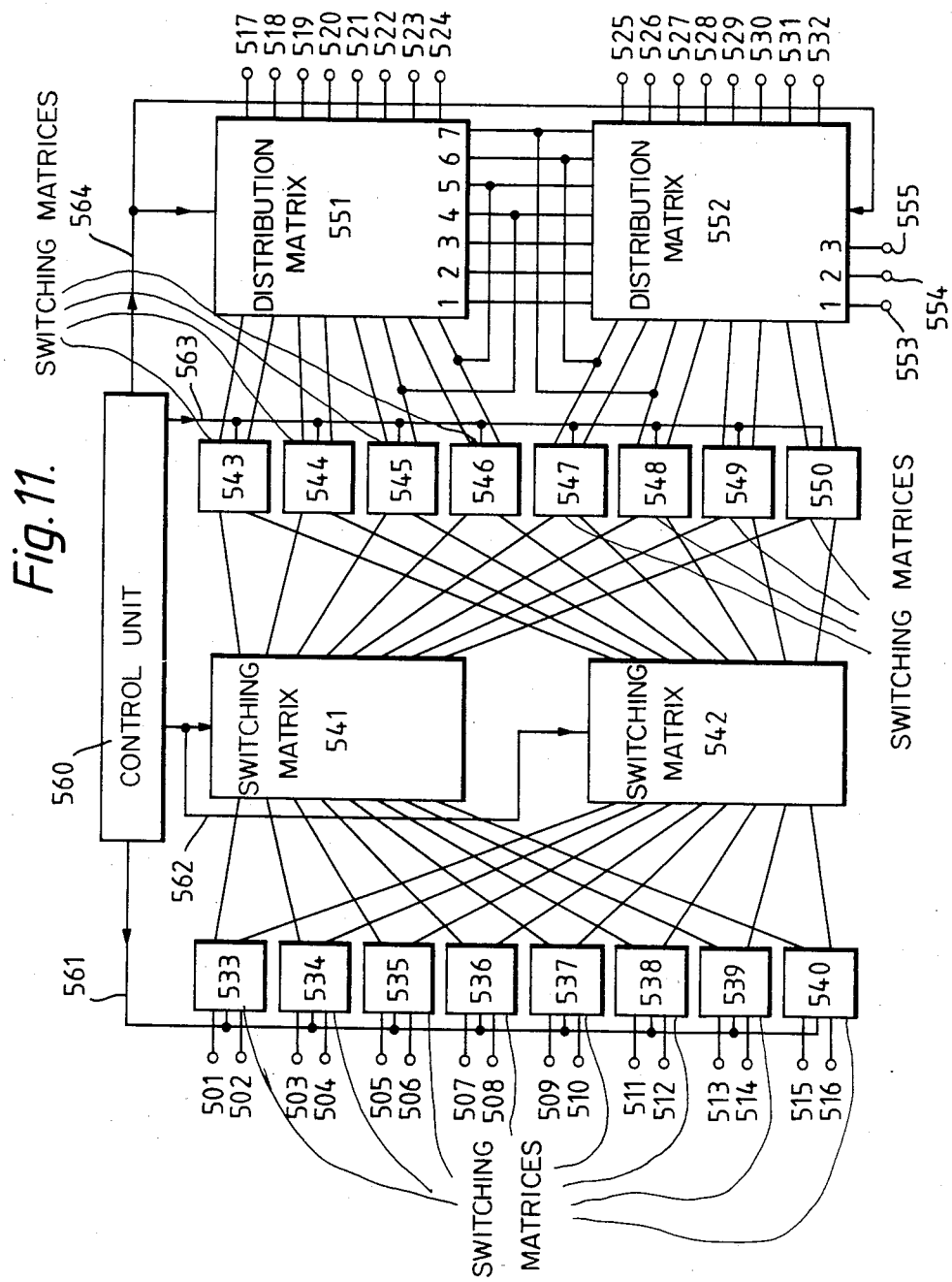
Figure 12:
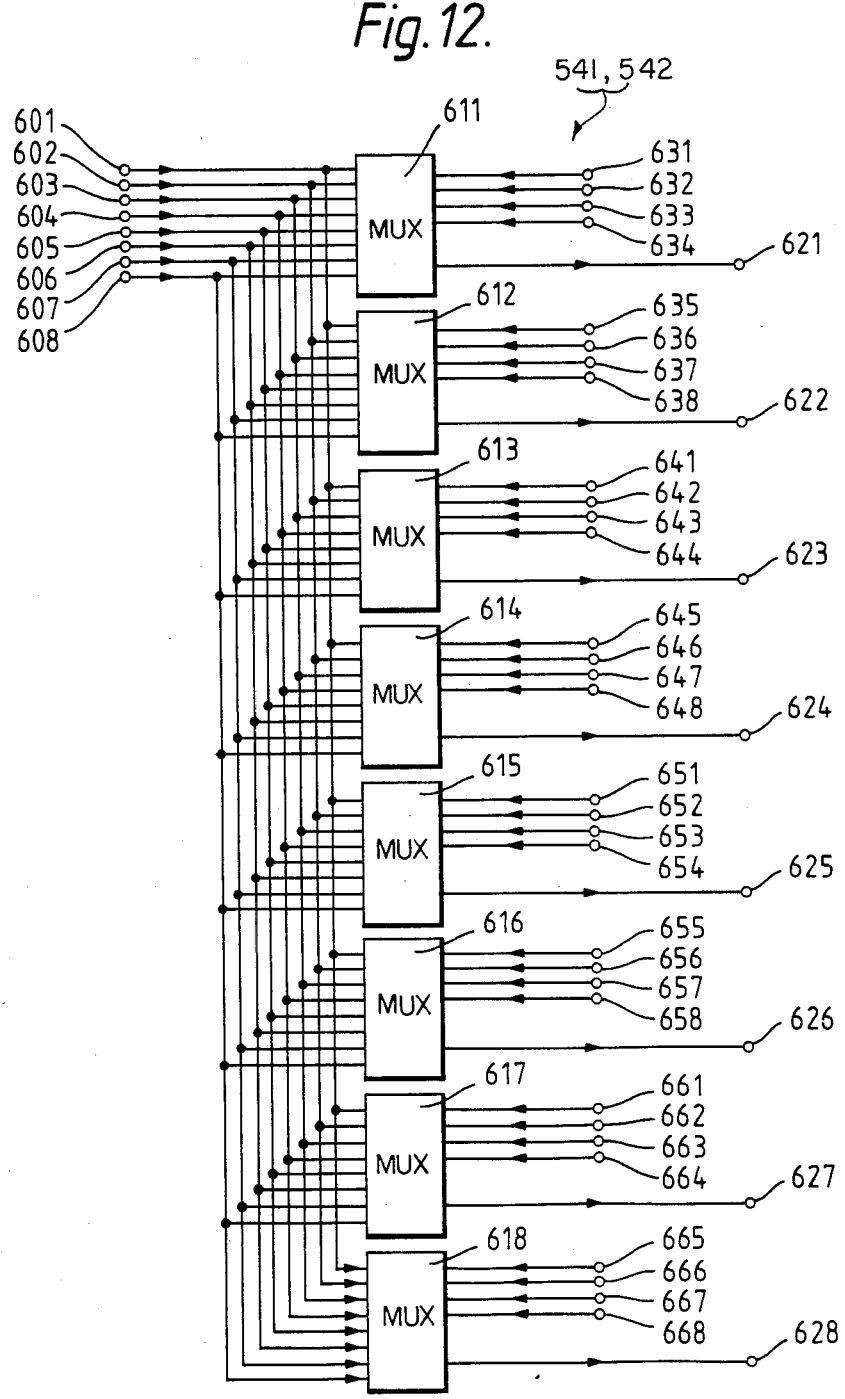
Figure 13:
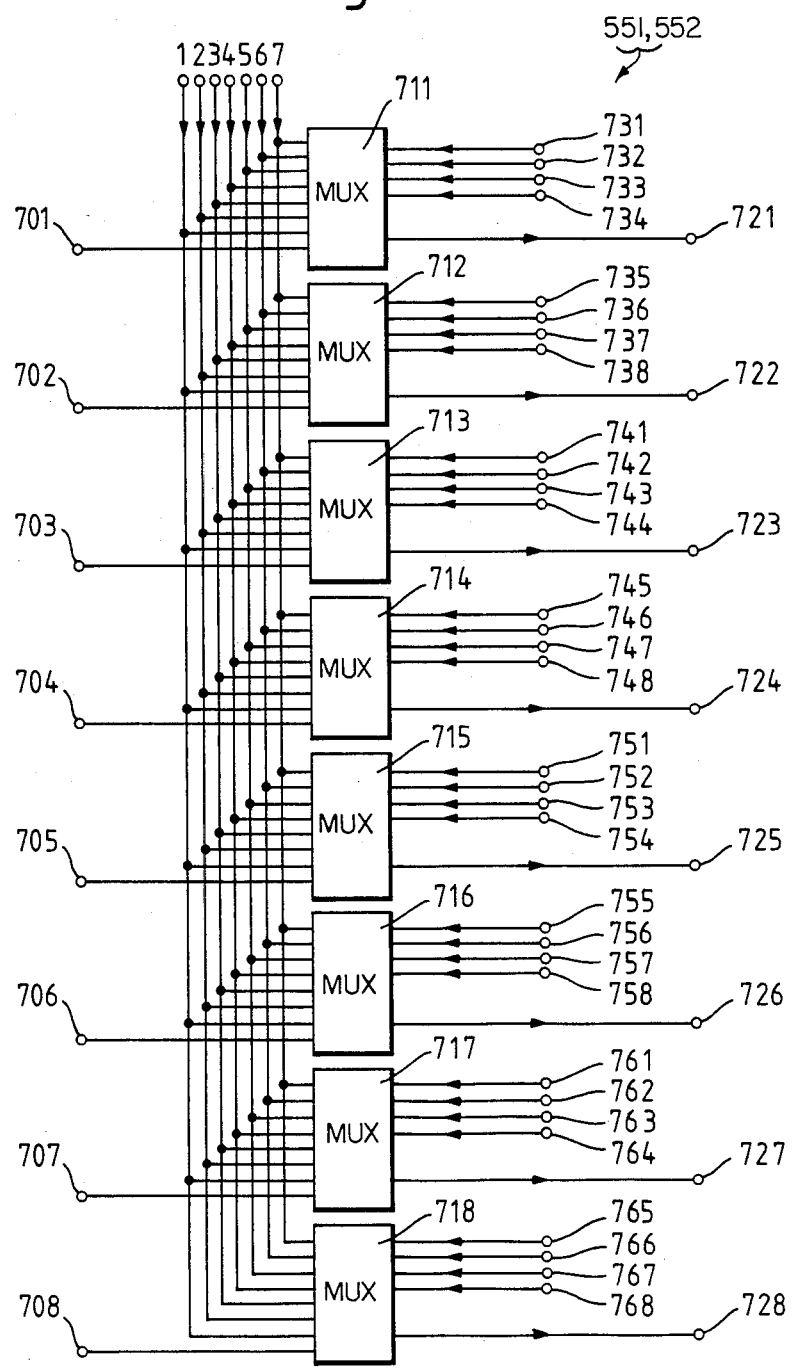
Figure 14:
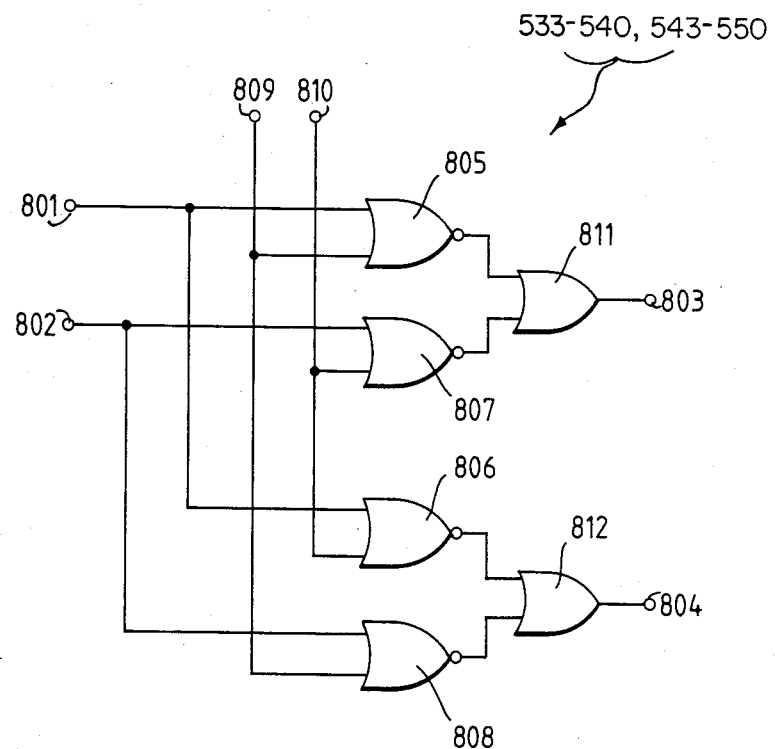
Figure 15:
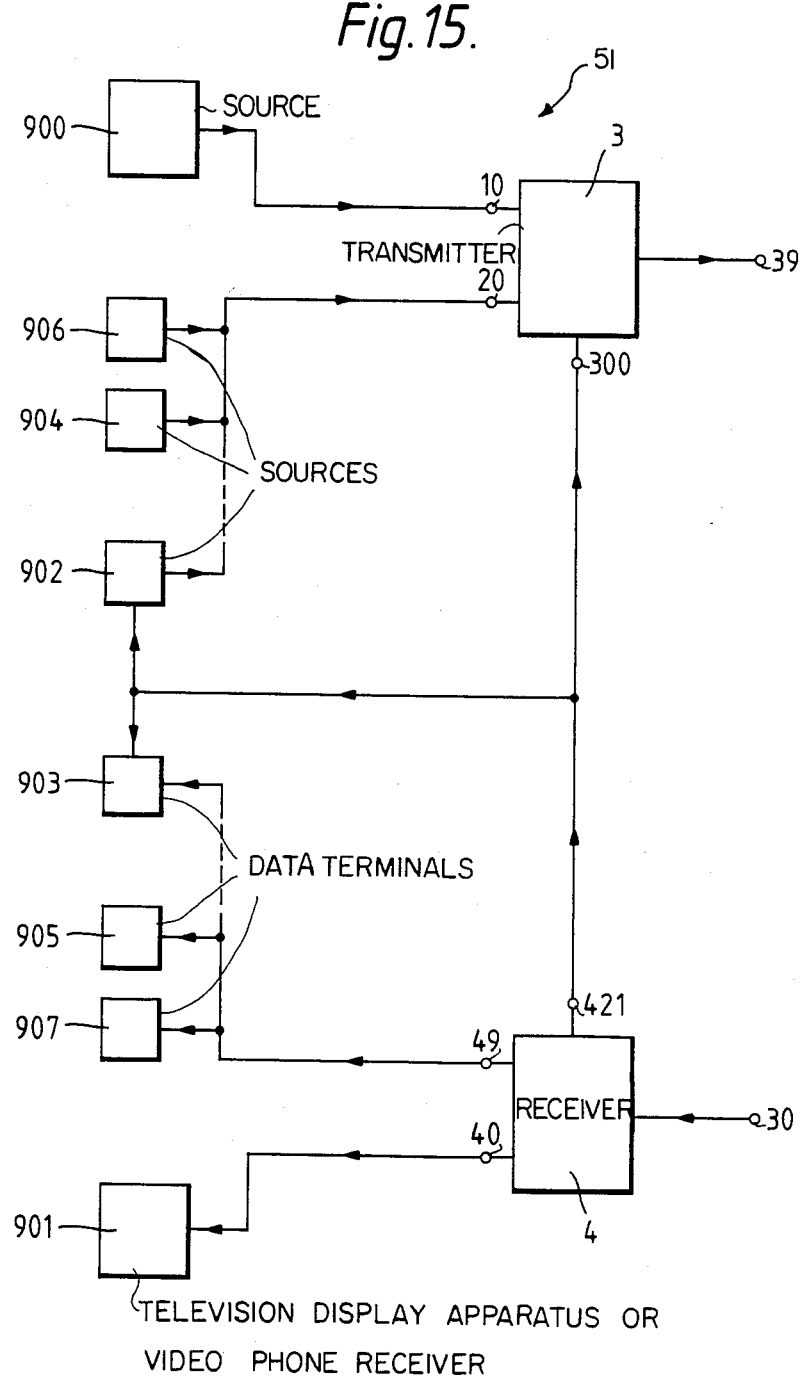

Embodiments of the invention will now be described, by way of example, with reference to the accompanying drawings, in which:

FIG. 1 shows in block schematic form a signal transmission arrangement in which two information signals are combined for transmission, FIG. 2 shows in block schematic form a transmitter for use in the signal transmission arrangement of FIG. 1, FIG. 3 shows in block schematic form a receiver for use in the signal transmission arrangement of FIG. 1, FIG. 4 shows a further embodiment of a transmitter for a arrangement as shown in FIG. 1, the transmitter being shown in greater detail than that of FIG. 2, FIGS. 5, 6 and 7 are timing diagrams illustrating waveforms in various parts of the transmitter shown in FIG. 4, FIG. 8 shows a further embodiment of a receiver which is suitable for use in the arrangement shown in FIG. 1 when it includes a transmitter as shown in FIG. 4, FIG. 9 is a timing diagram illustrating waveforms in various parts of the receiver shown in FIG. 8, FIG. 10 shows in block schematic form a communication system according to the invention employing the signal transmission arrangement of FIG. 1, FIG. 11 shows in block schematic form a selection and distribution switching network for use in the system shown in FIG. 10, FIG. 12 shows a first type of 8×8 switching matrix for use in the network of FIG. 11, FIG. 13 shows a second type of 8×8 switching matrix for use in the network of FIG. 11, FIG. 14 shows a 2×2 switching matrix for use in the network of FIG. 11, FIG. 15 shows in block schematic form a subscriber's station for use in the system of FIG. 10.

Figure 16:
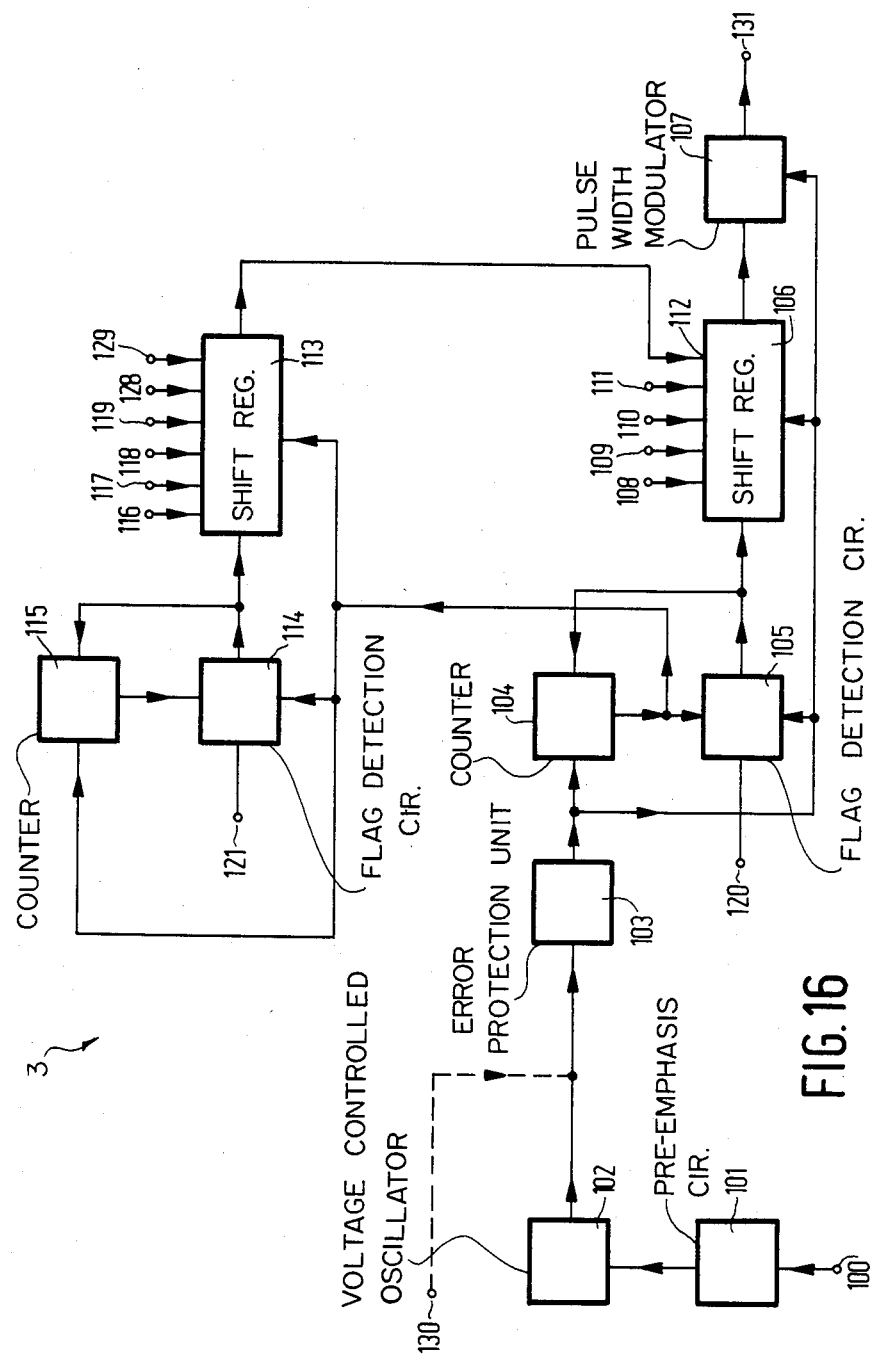
Figure 17:
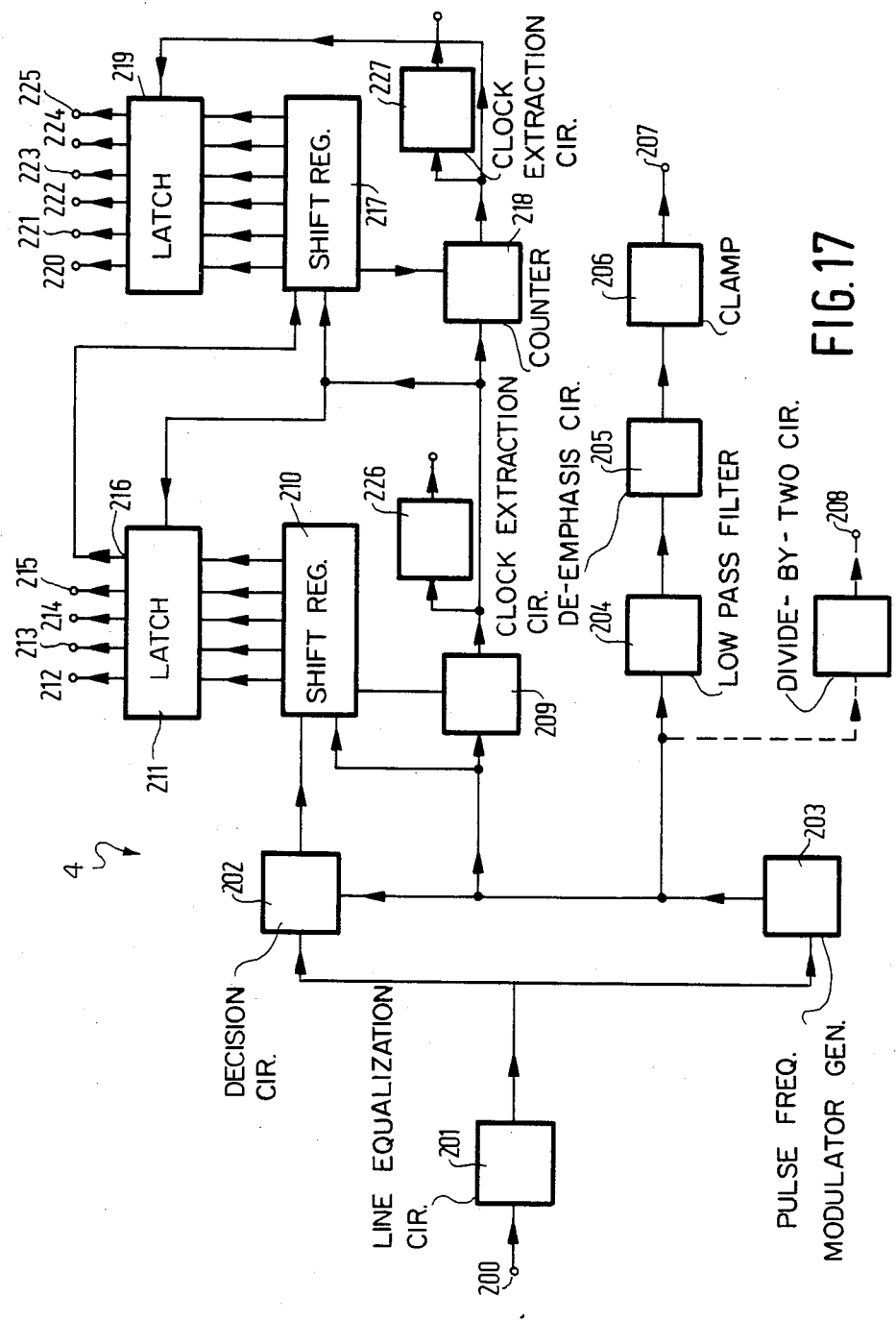
Figure 18:
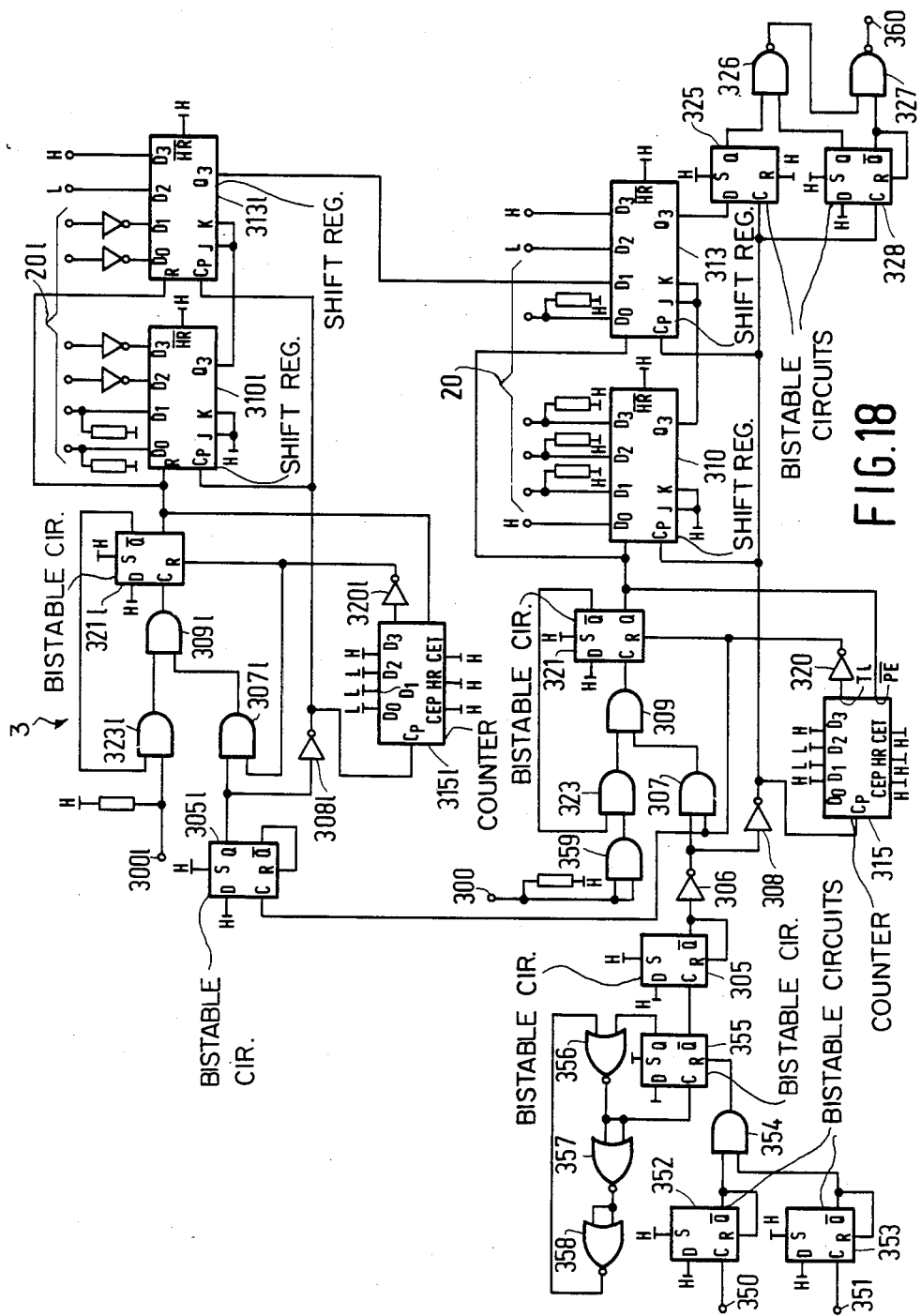

FIG. 16 shows in block schematic form a transmitter in which high and low speed data are multiplexed, FIG. 17 shows in block schematic form a receiver for receiving and demultiplexing the signal produced by the transmitter of FIG. 16, and FIG. 18 is a circuit diagram of an embodiment of a transmitter as shown in FIG. 16 which shows also some refinements which can be incorporated in the transmitter shown in FIG. 4.

FIG. 1 shows a signal transmission arrangement comprising a first information signal source 1 and a second information signal source 2 whose outputs are connected to first and second inputs of a transmitter 3. The transmitter 3 is coupled to a receiver 4 by means of a transmission link 5. The first information signal frequency modulates a carrier in the transmitter 3 to form a frequency modulated carrier signal. The frequency modulated carrier signal is hard limited so that the information content is contained solely in the transitions of the signal. The second information signal produces a variable width pulse whose leading edge is coincident with a transition of the frequency modulated signal. The second information signal modulates the pulse duration and the pulses are generated so that their leading edges coincide with a signal transition of the frequency modulated carrier signal. The pulses may be arranged to start on alternate transitions only, that is either all the positive going transitions or all the negative going transitions. This signal is transmitted by the transmitter 3 over the transmission link 5 to the receiver 4. The receiver 4 contains circuitry to separate the amplitude limited frequency modulated signal from the pulse width modulated signal. The first information signal is recovered from the frequency modulated carrier signal by producing a pulse having a constant amplitude and duration at each positive going transition of the frequency modulated carrier signal if positive going pulses are transmitted or at each negative going transition if negative going pulses are transmitted and low pass filtering the pulses. The pulses must be produced only on the positive going or only on the negative going transitions depending on the polarity of the pulses transmitted so that the variable time rear edge of the pulse width modulated signal is not detected.

The first information signal may be a video signal and it has been shown that the conversion of a video signal to a frequency modulated form permits the transmission and switching of the signal with logic circuitry operating at switching speeds below 40 MHz while allowing good quality to be obtained in the recovered video signal. The second information signal may be a source of data signals to allow the addition of a data transmission facility to the facility for transmitting video signals. The data may comprise added channels to carry suitable combinations of ISDN 144 Kbit/s streams, 1, 2 or 5 Mbit/s LAN streams and/or 64 Kbit/s channels for telephone speech or signalling.

The insertion of the second information signal by controlling the duration of pulses at positive transitions produces a signal which is pulse frequency modulated by the first information (or video) signal and pulse width modulated by the second information signal. The two modulations are not independent. The message content associated with different second information signals will cause offsets of the zero crossings carrying the video signal. These offsets will be minimized by operating with fast edges on the transmitted signal. The bandwidth required for the transmission must therefore be increased above the 40 MHz level which would be adequate for the video alone. However, since coaxial cable has useful bandwidth up to 100 MHz for lengths of a few hundred meters this requirement can easily be met in a star network where each link carries only the services for a single terminal. Further if optical fiber is used as the transmission medium then a very much greater bandwidth is available and transmission over greater distances is possible.

Let it be assumed that the system shown in FIG. 1 is arranged to transmit an analog video signal as the first information signal and a binary data signal as the second information signal. In this case the analogue signal frequency modulates a carrier in the transmitter 3. This frequency modulated carrier signal is hard limited so that the analog information is contained solely in the transition times of the carrier signal. At the same time the data signal produces either a long or a short pulse depending on the binary state to be transmitted. The leading edges of the long and short pulses are coincident with a positive (or negative) transition of the frequency modulated carrier signal. For the subsequent description of the embodiments it will be assumed that the leading edges of the pulses are co-incident with positive transitions of the FM signal, i.e. that positive going pulses are being transmitted, but it will be apparent that negative going pulses could be transmitted in which case their leading edges would be aligned with negative transitions of the FM signal.

At the receiver 4 the positive edges of the received signal are detected to produce a clock signal having a frequency which varies in dependence on the analog signal information. A decision circuit is operated by a delayed version of this clock and determines whether a long or short pulse has been received and provides a simple way to separate the data from the video signal. The video signal is detected by producing a pulse having a constant amplitude and duration on the positive transition of the received FM signal and low pass filtering the pulses produced.

The system so far described is completely asynchronous. In effect a data signal is added at each positive transition of the FM signal and is transmitted over the link to reappear at the decision circuit output. The sampling rate may than vary between, for example, 18 and 32 MHz according to the modulating video signal. The recovered data samples are subject to the jitter resulting from sampling at irregular intervals. The simple system is suitable for asynchronous data on a single data channel arriving at bit rates up to about 5 Mbit/s. A more sophisticated approach to data transmission can be used to extend the data handling capability to multiple channel asynchronous as well as synchronous data links.

FIG. 2 shows in block schematic form an embodiment of the transmitter 3 of FIG. 1. The transmitter shown in FIG. 3 has a first input 10 which is connected to a frequency modulator 31, so that a first information signal applied to the input 10 frequency modulates a carrier in the frequency modulator 31 whose output is passed to a limiting circuit 32 which provides a hard limited frequency modulated carrier signal at its output. The output of the limiter 32 is connected to a first input of a pulse generator 33. The second information signal is fed to a second input 20 of the transmitter 3. The second input 20 is connected to a second input of the pulse generator 33 while the output of the pulse generator 33 is connected to an output 39 of the transmitter 3.

In operation when data is present on the input 20 a logical '1' on input 20 will cause a long pulse to be generated by the pulse generator 33 on each positive going transition of the frequency modulated signal. Similarly when a logical '0' appears on the input 20 the pulse generator 33 will produce a short pulse on each positive going transition of the frequency modulated signal. Thus as the data changes a series of short and long pulses will be produced, the leading edges of the pulses being aligned with the positive transitions of the frequency modulated signal. Thus the signal transmitted over the transmission link 5 consists purely of a train of pulses whose repetition rate is dependent on the frequency modulation and whose duration is dependent on the data applied to the input 20. Consequently a signal which is a combination of frequency modulation and pulse width modulation is produced. Alternatively the long pulses could represent a logical '0' and the short pulses a logical '1'. It is of course necessary that the duration of the long pulses produced by the pulse generator 33 is less that the period of the frequency modulated signal at its highest frequency excursion. With this arrangement it is necessary to detect only the positive going transitions at the receiver and hence the signal to noise ratio is correspondingly reduced. However, by increasing the bandwidth of the transmission path and the receiver circuit it would be possible to make use of both transitions of the frequency modulated signal. This will involve complexity at the transmitter and require that the longest pulse generated by the pulse generator 33 has a duration of less than half the period of the highest frequency of the frequency modulated signal.

FIG. 3 shows an embodiment of a receiver suitable for use as the receiver 4 of the system shown in FIG. 1. The receiver shown in FIG. 3 has an input 30 which receives the transmitted signal from the transmitter 3 over the transmission path 5. The input 30 is connected to an equalization and gain circuit 41 which equalized the characteristics of the transmission path 5 and amplifies the received signal to a given output level. The output of the equalization and gain circuit 41 is connected to a first input of a decision circuit 43 and to an input of a positive edge detector 42. The output of the positive edge detector is connected to a second input of the decision circuit 43 and to an input of a pulse generator 44 which produces a pulse on each positive edge of the input signal the pulse having a constant amplitude and duration. The output of the pulse generator 44 is passed to a low pass filter 45, a de-emphasis circuit 46, an amplifier circuit 47 and a video clamping circuit 48 which feeds an output 49 of the receiver. The pulse generator 44 and low pass filter 45 form a demodulator for the frequency modulated video signal. The decision circuit 43 takes the input from the equalization and gain circuit 41 and decides whether a long or a short pulse has been added to the positive transition of the frequency modulated signal. Once the decision has been taken an indication of whether a binary '0' or binary '2' has been received is fed to an output 40 as the data output.

It should be noted that although the circuit 42 has been described as a positive edge detector it could equally well be a negative edge detector if negative going data pulses are transmitted. The decision circuit 43 merely takes the output of the edge detector circuit 42 and uses this in differentiating between the long and short pulses.

FIG. 4 shows an embodiment of a transmitter for use in the arrangement of FIG. 1, in which the second information signal source comprises a 13 bit data word. The transmitter shown in FIG. 4 has an input 10 for a wideband analog signal, for example a video signal, which is connected to the input of an amplifier 301 whose output is connected to a pre-emphasis circuit 302. The output of the pre-emphasis circuit is connected to a control input of a voltage controlled oscillator 303. The output voltage produced by the pre-emphasis circuit 302 controls the frequency of the voltage controlled oscillator 303 and consequently the output of the voltage controlled oscillator 303 is frequency modulated by the wideband analog signal (hereinafter called the video signal). The voltage controlled oscillator 303 may produce a square wave signal or if it produces a sinewave output this is then passed to a limiter (not shown) which squares the sinewave. This signal is applied to both inputs of a two input AND gate 304 whose output is connected to the clock input of a D-type bistable circuit 305. The AND gate 304 merely acts as a buffer between the output of the VCO 303 and the clock input of the bistable circuit 305. The Q output of the bistable 305 is connected to both inputs of a two input AND gate 306, while the $\overline{Q}$ output of the bistable 305 is connected to the reset input of the bistable 305. The set input of the bistable 305 is held high, i.e. at a logical '1'. The output of the AND gate 306 is connected to a first input of a further AND gate 307 and to the input of an inverter 308. The output of the AND gate 307 is connected to a first input of an AND gate 309. The output of the inverter 308 is connected to clock pulse inputs of four 4 bit shift registers 310,311,312 and 313 connected in cascade and also to the input of an inverter 314. The output of the inverter 314 is connected to the clock pulse input of a counter 315 via an inverter 316 and two series connected AND gates 317 and 318. The output of the AND gate 318 is connected to the clock pulse input of the counter 315 and to an input of an inverter 319. A terminal count output of the counter 315 is connected to a first input of an OR gate 340 whose output is connected via an inverter 320 to the second input of the AND gate 307, to a reset input of a D-type bistable circuit 321 and to a reset input of a further D-type bistable circuit 322.

A terminal 300 is connected to a first input of an AND gate 323 whose output is connected to a second input of the AND gate 309. The output of the AND gate 309 is fed to a clock input of the D-type bistable 321. The $\overline{Q}$ output of the D-type bistable 321 is connected to a second input of the AND gate 323. The Q output of the bistable 321 is connected to a parallel load enable pin on the shift registers 310,311,312 and 313.

The Q3 output of the shift register 313 is connected to a first input of an AND gate 324 whose output is connected to the clock input of the D-type bistable 322. The $\overline{Q}$ output of the bistable 322 is connected to a second input of the AND gate 324. The Q output of the bistable 322 is connected to a parallel load enable pin on the counter 315. The Q3 output of the shift register 313 is connected to the D input of a D-type bistable circuit 325. The Q output of the bistable 325 is connected to a first input of a NAND gate 326 whose output is connected to a first input of a NAND gate 327. The output of the inverter 319 is connected, via two serially connected AND gates 329 and 330, to the clock inputs of the bistable 325 and a further D-type bistable circuit 328. The Q output of the bistable 328 is connected to a second input of the NAND gate 326, while the $\overline{Q}$ output of the bistable 328 is connected to a second input of the NAND gate 327 and to a reset input of the bistable 328. The output of NAND gate 327 is connected to the base of a transistor T1 whose collector is connected to a positive voltage source and whose emitter is connected via a resistor R1 to a negative voltage source. The junction of the emitter of transistor T1 and resistor R1 is connected via a resistor R2 to an output terminal 39. The D inputs of the bistable circuits 305,321,322 and 328 are all connected to a logical '1'. The Q3 output of the shift register 310 is connected to the J and $\overline{K}$ inputs of the shift register 311, the Q3 output of the shift register 311 is connected to the J and $\overline{K}$ inputs of the shift register 312, and the Q3 output of the shift register 312 is connected to the J and $\overline{K}$ inputs of the shift register 313. The J and $\overline{K}$ inputs of the shift register 310 are connected to a logical '1'. Thus the four 4 bit shift registers 310,311,312 and 313 form a 16 bit shift register. The 4 bit shift registers in this embodiment are of the type 74HC195. The first parallel input of the shift register 310 is connected to a logical '1'. The other three parallel inputs together with the four parallel inputs of the shift register 311, the four parallel inputs of the shift register 312, and the first two parallel inputs of the shift register 313 accept the thirteen bits of the data word from the input 20. The third parallel input of the shift register 313 is connected to a logical '0' and the fourth parallel input of the shift register 313 is connected to a logical '1'. An initial reset generator is connected to a reset input of the counter 315 and via an inverter 341 to a second input of the OR gate 340. The initial reset generator generates a signal to reset the counter 315 to an initial state when power is first switched on and consists of a resistor R3 and a capacitor C1 connected in series across the power supply. The set inputs of bistable circuits 321, 322, 325 and 328 are all connected to a logical '1'.

When power is switched on the initial reset generator resets the counter 315 to zero, and thus the terminal count output is at a logical '0'. The terminal count output resets the bistable circuits 321 and 322 via the inverter 341, the OR gate 340 and the inverter 320. The Q output of bistable 321 will then be at a logical '0' and data will be loaded into the shift registers 310 to 313 from the input 20. The output of the VCO 303 is applied to the clock input of the bistable 305 which produces a short pulse on each positive transition of the signal applied to its clock input since its $\overline{Q}$ output is connected to its reset input and causes the bistable 305 to be reset after a short interval dependent on the switching times of the bistable. These short pulses are passed through the AND gate 306, the output of which is represented by waveform (a) in FIG. 5. This signal provides a clock signal, which is delayed by appropriate amounts by passing through gates and/or inverters, for bistables 321 and 322, shift registers 310-313, counter 315, and bistables 325 and 328. If the input 300 is at a logical '0' the shift registers 310-313 do not shift information serially since the parallel load enable input is held at a logical '0'. Consequently the $\overline{Q3}$ output of shift register 313 is at a logical '0' and the Q3 output is at a logical '1'. The Q output of the bistable 322 is at a logical '0' and hence the counter 315 is loaded with a preset count but its clock input is disabled. The D input of bistable 325 is held at a logical '1' and at each positive transition of the clock applied to bistables 325 and 328 a long pulse is produced at the output of NAND gate 327 in a manner which will be further described hereinafter.

When the input signal at input 300 goes to a logical '1' a clock pulse is allowed through AND gate 309 and bistable 321 changes state. The $\overline{Q}$ output of bistable 321 then goes to a logical '0' and consequently so does the output of AND gate 323 preventing further clock pulses from being applied to the clock input of bistable 321. Waveforms (b), (c), (d), (e), (f) and (g) show the input signal at input 300, the output of AND gate 323, the outputs of AND gate 307, the output of AND gate 309, the $\overline{Q}$ output of bistable 321, and the Q output of bistable 321, respectively.

Figure 5:
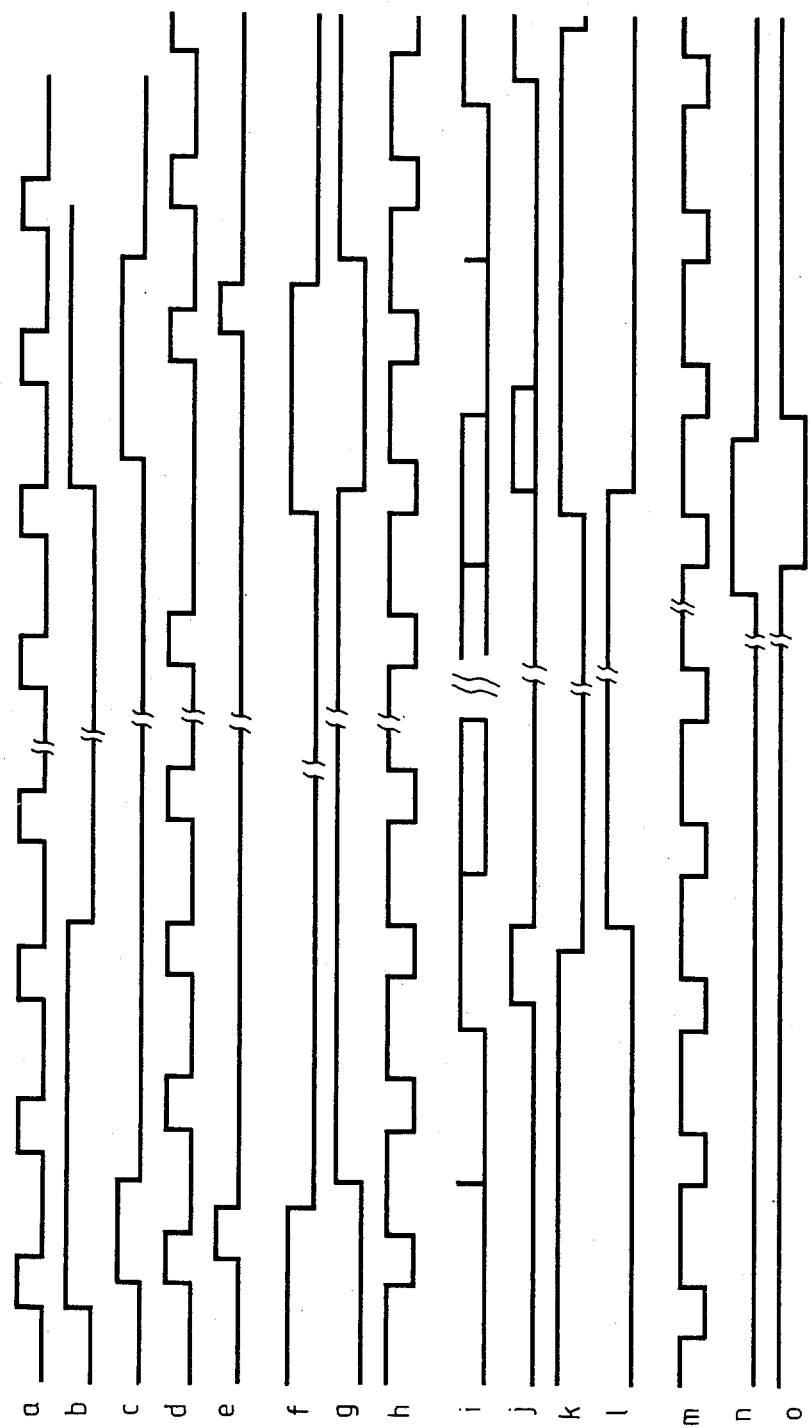

The parallel load enable inputs of the shift registers 310-313, which are connected to the Q output of the bistabel 321, are now at a logical '1' and clock pulses applied to clock pulse inputs of the shift registers 310-313 from the output of the inverter 308 (waveform h) in FIG. 5 are effective to shift the data previously loaded into the shift register to the serial outputs Q3 and $\overline{Q3}$ of the shift register 313. It is arranged that the first bit of each data word to be transmitted i.e. the start bit, is a logical '0' by holding the third parallel input of the shift register 313 low. Therefore the first effective clock pulse causes the $\overline{Q3}$ output of shift register 313 to go to a logical '1'. This clocks the bistable 322 through the AND gate 324 and causes its Q output to go to a logical '1' thus removing the parallel load enable signal from the counter 315 which now is clocked by the clock pulses at the output of AND gate 318. The output of the AND gate 318 is shown as waveform (m) in FIG. 5. At the same time the Q3 output of shift register 313 goes to a logical '0' and this signal is applied to the D input of the bistable 325 and causes a short pulse to be produced at the output of NAND gate 327 the position of the leading edge of this pulse being determined by the clock pulse at the output of AND gate 330 which is applied to the bistable circuits 325 and 328.

As successive clock pulses are produced at the output of AND gate 306, waveform (a) in FIG. 5, so the parallel data entered into the shift register from input 20 is shifted serially through the shift register to appear at the Q3 and $\overline{Q3}$ outputs of shift register 313. The data at the Q3 output is the inverse of that shown in waveform (i) of FIG. 5 where the blocks represent data the state of which is determined by the information presented to the input 20.

The counter 315 is arranged so that it reaches its terminal count while the last data bit is being read out of the shift register 313, including the stop bit produced by holding the first parallel input of shift register 210 high. When the terminal count is reached the counter produces an output, represented by waveform (n) in FIG. 5, which is fed via the OR gate 340 and the inverter 320 to reset inputs of the bistable circuits 321 and 322. Thus the Q outputs of bistable circuits 321 and 322 both go to a logical '0' and cause the information on the parallel inputs to be read into the shift registers 310-313 and the counter 315. When the parallel information is read into the counter 315 the reset signal is removed and the process of transmitting the new data on input 20 is commenced when the signal on the input 300 (data flag) goes to a logical '1'.

A description will now be given, with the aid of the waveforms shown in FIG. 6, of how the data applied to the D input of bistable 325 is converted into long and short pulses whose leading edges are aligned with transitions of the FM clock. Waveform (6a) shows the data applied to the D input of bistable 325 while waveform (6b) shows the FM clock at the output of AND gate 330 which is applied to the clock inputs of the bistables 325 and 328. If a logical '0' is present at the D input of bistable 325 when a positive edge of the clock is applied to its clock input then the Q output of bistable 325 (waveform (6d)) goes to a logical '0'. At the same time the Q output of bistable 328 (waveform 6e)) goes to a logical '1'. Since the $\overline{Q}$ output of bistable 328 is connected to its reset input the Q output returns to a logical '0' after a short delay which is dependent on the switching times within the bistable 328 but which can be increased by any desired amount by including a delay between the $\overline{Q}$ output and the reset input. Since the Q output of bistable 325 is at a logical '0' the output of NAND gate 326 is at a logical '1'. Consequently the output of the NAND gate 327 (waveform (6g)) will be at a logical '1' only when the $\overline{Q}$ output of bistable 328 (waveform (6c)) is at a logical '0'. Hence when the D input of bistable 325 is at a logical '0' a short pulse will be produced at the output of NAND gate 327.

If the data applied to the D input of bistable 325 is at a logical '1' when a positive edge of the FM clock is applied to the clock inputs of bistables 325 and 328 then both their Q outputs will be set to a logical '1'. Consequently the output of the NAND gate 326 will go to a logical '0' and that of NAND gate 327 to a logical '1'. After a short delay the Q output of bistable 328 will be reset to a logical '0' as before and after a further delay the output of NAND gate 326 will go to a logical '1'. Thus a long pulse will be produced at the output of NAND gate 327, the duration of the long pulse being equal to that of the short pulse plus the difference in the switching delays between the Q and Q outputs of the bistable 328 and the delay in the NAND gate 326.

The leading edge of the long and short pulses bears a fixed relationship to the clock pulses applied to the bistable 328, the position of the leading edges of these pulses being solely determined by the timing of the clock pulses and the fixed delays through the bistables and gates. Consequently the production of the long and short pulses is synchronized with the positive transitions of the frequency modulated signal. The delay of the transitions of the frequency modulated signal through the transmitter are not significant since all edges will be delayed by the same time and it is only the precise relative timing of the edges which are important, the precise absolute timing of the edges is immaterial. Consequently, it is of no significance that the pulses start a fixed period after the clock pulse is applied to the bistables 325 and 328 which itself is a further fixed period after the positive transition of the output of the AND gate 304 since this delay is constant for all edges.

The appearance of a logical '1' on the data flag input 300 may be independent of the FM clock signal and consequently it is then desirable to provide an arrangement which will initiate the shift register operating cycle in an error free manner regardless of the relative timing of the data flag and FM clock. In particular for the logic family used in this particular embodiment the parallel load signal to the shift registers 310-313, i.e. the Q output of bistable 321 should occur at least 15 nSecs before the clock transition on the clock inputs of the shift registers 310-313, i.e. the output of inverter 308. The arrangement of AND gates 307, 309 and 323 and the bistable 321 is designed for this purpose. FIG. 7 shows waveforms of the signals at various points in this arrangement when the data flag (waveform (7b)) occurs at three different times relative to the FM clock (waveform (7a)). These different timings are shown in FIGS. 7A, 7B and 7C. The situation illustrated in FIG. 7A is when the data flag occurs well before the FM clock transition. In that case the output of AND gate 323 (waveform (7c)) goes to a logical '1' since the Q output of bistable 321 is at a logical '1'. The output of AND gate 307 follows the FM clock with a delay caused by the switch delay of AND gate 307 (waveform (7d)) and the output of AND gate 309 consequently also follows the FM clock with a further delay caused by the switching delay of the AND gate 309 (waveform (7e)). As a result the bistable 321 changes state and the Q output goes to a logical '1' (waveform (7g)) while the $\overline{Q}$ output goes to a logical '0' (waveform (7f)). The shift registers 310-313 are then clocked on the subsequent positive transition of the FM clock at the output of the inverter 308 (waveform (7h)). The $\overline{Q}$ output of the bistable 321 prevents any further clock pulses being applied to the clock input of the bistable 321 by applying an inhibit signal via AND gates 323 and 309.

FIG. 7B illustrates the case where the data flag appears so close to the transition of the FM clock that the clock pulse applied to the bistable 321 is not of sufficient amplitude to change the state of the bistable 321. Consequently the Q output remains at a logical '0' thus preventing the shift registers 310-313 from being clocked and the $\overline{Q}$ output remains at a logical '1' and consequently prepares AND gate 309 for the next FM clock pulse. When the next FM clock pulse occurs the arrangement operates in the same manner as described with reference to FIG. 7A (assuming that the data flag is still high).

FIG. 7C illustrates the case where the data flag goes high after the relevant transition of the FM clock and may be considered as an extreme example of the situation illustrated in FIG. 7A, i.e. the data flag goes high well before the occurrance of the next FM clock transition.

In the transmitter shown in FIG. 4 the FM carrier frequency may be set to be 25 MHz and it may be arranged for the analogue signal to produce a peak deviation of 7.2 MHz, in which case the FM clock will vary in frequency between 17.8 MHz and 32.2 MHz. The transmitter is arranged to transmit a serial word comprising a start bit, 13 data bits, and a stop bit giving a total word length of 15 bits. Allowing for the asynchronous relationship between the data flag and the FM clock it becomes possible to clock data into the shift registers from the input 20 at a rate of 1 MHz set by the data flag, i.e. the data flag comprises pulses at a repetition rate of 1 MHz. Thus 13 channels are provided which may each transmit data at a rate of up to 1 Mbit/sec, or if fewer than 13 channels are provided an appropriately increased data transmission rate may be achieved.

In FIGS. 5 to 7 the FM clock has been shown unmodulated for simplicity. However, the modulation on the FM clock will not materially effect the data transmitted. The maximum data rate is dependent on the minimum carrier frequency but if the modulation increases the carrier frequency individual bits of each word will be transmitted more quickly but the word rate is dependent only on the data flag rate and consequently the only effect of varying the carrier frequency is to correspondingly vary the number of long pulses (logical '1's) transmitted between each data word.

FIG. 8 shows a receiver for use in the system of FIG. 1, the receiver being complementary to the transmitter shown in FIG. 4. The receiver shown in FIG. 8 has an input 30 which is connected via an inverting equalization and gain stage 401 to the input of an inverter 402. The output of the inverter is connected to the clock input of a clocked D-type bistable circuit 403 and to the D-input of a clocked D-type bistable circuit 404. The Q output of the bistable 403 is connected through an AND gate 405 to the clock input of the bistable 404 and to a clock input of a shift register 406. The shift register 406 is similar to that in the transmitter shown in FIG. 4 and consists of four 4 bit shift registers connected in cascade. The Q output of the bistable 404 is connected to J and $\overline{K}$ inputs of the shift register 406. The Q0 output of the shift register 406 is connected to a first input of an OR gate 407 and to a first input of an AND gate 408. The output of the OR gate 407 is connected to the reset input of a D-type bistable circuit 409. The $\overline{Q}$ output of the bistable 409 is connected to a second input of the OR gate 407 and to a parallel load input of a counter 410. A terminal count output of the counter 410 is connected to a second input of the AND gate 408 and to the clock input of the bistable circuit 409. The Q output of the bistable 403 is connected to the input of an OR gate 411 whose output is connected to the clock input of the counter 410. The $\overline{Q}$ output of the bistable 403 is also connected to its reset input. The parallel outputs of the shift register 406 are connected to a 13 bit latch circuit 412. The output of the AND gate 408 is connected to a clock pin of the latch 412 and may also be connected to a clock extraction circuit 420 which produces a clock derived from the transmitted word rate on output 421. Alternatively the clock information may be sent over one of the data channels and be derived from one of the parallel outputs of the latch 412.

The $\overline{Q}$ output of the bistable 403 is also connected to an input of an inverter 413 and to the reset input of a D-type bistable circuit 414. The output of the inverter 413 is connected to the input of a further inverter 415 whose output is connected to the junction of a yet further inverter 416 and a capacitor C1, the capacitor C1 being connected between the output of the inverter 415 and a.c. ground. The output of the inverter 416 is fed to the clock pulse input of the bistable 414. The $\overline{Q}$ output of the bistable 414 is fed to the input of a low pass filter 415 whose output is connected to the input of a de-emphasis circuit 416. The output of the de-emphasis circuit is passed through an amplifier 417 to a clamp 418 which is connected to the output 49 of the receiver.

In operation the received signal is applied to input 30 and is passed through the equalization and gain stage 401 to reconstitute the edges of the signal. The output of the inverter 402 is passed to the D input of the bistable 404 and to the clock input of the bistable 403. The bistable 403 acts as a positive edge detector and produces a short pulse at each positive going transition of the input signal. The length of the pulse is dependent on the delay from the $\overline{Q}$ output of the bistable to its reset input. The pulse at the Q output of the bistable 403 is delayed by about two gate delays and is further delayed by AND gate 405 so that the positive clock transition arrives approximately 15 nSecs after the pulse at the D input at the bistable 404. The short pulse is 10 nSecs long and the long pulse 20 nSecs long and hence a decision is made at 15 nSecs to determine whether a long or short pulse has been received. Thus, if a short pulse has been transmitted the signal on the D input of the bistable 404 will be at a logical '0' when the clock transition at the output of the AND gate 405 and hence the clock input of the bistable 404 occurs. However if a long pulse is transmitted a logical '1' will still be present on the D input of the bistable 404 when the clock transition at the clock input of bistable 404 occurs. Thus the Q output of the bistable 404 will represent the logical state '1' or '0' which appeared on the D input at the instant of the clock pulse transition at the bistable 404. Thus the bistable 404 forms a decision circuit.

It is arranged for the particular transmitter and receiver illustrated in FIGS. 4 and 8 that a data word always starts with a logical '0' and that if no data is present to be transmitted a series of logical '1's is transmitted, in other words long pulses. When the first logical '0' appears at the Q output of bistable 404 the Q0 output of the shift register 406 goes to a logical '0' and causes the bistable 409 to be reset. Consequently, the $\overline{Q}$ output of bistable 409 goes to a logical '1' and enables the counter 410 to start counting clock pulses derived from the positive going edges of the input signal. At the same time the terminal count output of the counter 410 will apply a logical '0' to the input of the AND gate 408 preventing the latches 412 from storing the parallel outputs of the shift register 406. When the counter 410 reaches its terminal count a logical '1' is produced on the terminal count output which clocks the bistable 409 causing the $\overline{Q}$ output to go to a logical '0' and loading a preset number into the counter 410. At the same time the AND gate 408 is enabled and clocks the output of the shift register 406 into the latch 412. The parallel outputs of the latch 412 are fed to the data output 40 of the receiver. This process is then repeated for the next data word when the Q0 output of the shift register 406 again goes to a logical '0' and causes the bistable 409 to be reset.

The positive edge detector output from the $\overline{Q}$ output of the bistable 403 is fed to the inverter 413 and the reset input of the bistable 414. The inverters 413,415 and 416, the capacitor C2 and the bistable 414 form a pulse generator which generates a pulse having a constant amplitude and duration on each positive transition of the input signal at the $\overline{Q}$ output of the bistable 414. The duration of the pulse is determined by the transmission delays of the inverters 413,415 and 416 and of the bistable 414 and the value of the capacitor C2. This constant duration pulse from the $\overline{Q}$ output of the bistable 414 is low pass filtered by the low pass filter 415 and fed to a de-emphasise circuit 416. Its output level is then brought to a desired value in the amplifier 417 and it is clamped in the clamp circuit 418 before being fed to the output of the receiver 49 where it appears as a video signal having a desired amplitude and being clamped at a desired black level.

The logic circuits in the receiver may all be formed from the 74HC family of CMOS circuits with the exception of the decision circuit 404 which is formed from a bistable selected from the 74S family of TTL logic circuits. The reason for this selection is that, at present, the CMOS standard circuits do not have sufficient speed capability to enable the decision to be consistently made. It is, of course, envisaged that the transmitter and receiver may have the standard circuit elements replaced by a large scale integrated circuit of dedicated design.

FIG. 9 is a timing diagram showing waveforms in various parts of the receiver of FIG. 8. Waveform (a) shows the output of the inverter 402, that is the D input of the decision circuit 404 and the clock input of the edge detector 403; waveform (b) shows the Q output of the edge detector 403; waveform (c) shows the $\overline{Q}$ output of the edge detector circuit 403; waveform (d) shows the output of the OR gate 411, that is the clock pulse input of the counter 410; waveform (e) shows the output of the AND gate 405, that is the clock pulse input of the decision circuit 404 and of the shift register 406; waveform (f) shows the Q output of the decision circuit 404, that is the data presented to the shift register 406; waveform (g) shows the Q0 output of the shift register 406; waveform (h) shows the reset input of the bistable 409; waveform (i) shows the parallel load input of the counter 410; waveform (j) shows the terminal count output of the counter that is the second input of the AND gate 408 and the clock input of the bistable 409; and waveform (k) shows the output from the AND gate 408 that is the clock input of the latches 412.

While the description of the transmitter and receiver shown in FIGS. 4 and 8 has assumed a wideband analog signal (video signal) as the first information signal frequency modulating the carrier and a 13 bit data word as the second information signal various other arrangements are possible. For example, the first information signal could be a digital signal which would cause the carrier to switch between two frequencies at the data rate and the second information signal could comprise a longer or shorter data word. The data signals may be derived from more than one source and be multiplexed on to the transmitter input 20 and similar demultiplexing arrangements included after the output 40 of the receiver. A variety of methods of framing and synchronization may be used. The data sources may be synchronous or asynchronous.

The embodiments so far described have shown the transmitter and receiver connected by a fixed transmission path. However, the invention is applicable to switched systems where there are a plurality of tranmitters and a plurality of receivers, the transmitters being selectively connectable to any of the receivers. Such a switched system in shown in FIG. 10, in block schematic form.

The communication system shown in FIG. 10 comprises a plurality of subscriber's stations 51-1 to 51-n each of which are connected to a central switching network by means of transmit paths 53-1 to 53-n and receive paths 54-1 to 54-n. The transmit and receive paths may be coaxial cables, optical fibers or any other convenient transmission media having a appropriate bandwidth. The central switching nework comprises a plurality of input circuits 52-1 to 52-n, one for each subscriber, a selection and distribution switching network 57 for the frequency modulated signal and a digital switch 60 for the pulse width modulated data signal. Each subscriber station comprises a transmitter 3 and a receiver 4 of the form shown in FIGS. 2 and 3 or 4 and 8. The transmitters 3 have a first input 10 for receiving the first information signal and a second input 20 for receiving the second information signal. The subscriber station will also include sources of the information signals which may include video telephones, synchronous and asynchronous data sources such as computer terminals and telephone speech sources which may be encoded as 64 Kbit/sec digital data streams.

The input circuits 52-1 to 52-n each comprise a transmitter 3, a receiver 4, and an interface circuit 55. Each input circuit supplies the FM signal to the selection and distribution switching network 57 over lines 56-1 to 56-n and receives a selected FM signal over lines 58-1 to 58-n. The pulse width modulated data signals are separated and detected by the receivers and applied to the digital switch 60 via the interface circuit 55 on the lines 59-1 to 59-n. Digital data from the switch 60 is fed to the input circuits 52-1 to 52-n over the lines 61-1 to 61-n. The selection and distribution switching network 57 is also provided with inputs 62-1 to 62-m to which video signals for distribution may be connected.

The digital switch 60 may take any convenient form depending on the type of data to be switched. This may be, for example 1 Mbit/sec synchronous data streams, 64 kbit synchronous or asynchronous data, 9.6 kbit asynchronous data, etc. The digital switch may be a 144 kbit ISDN switch or could be a packet switching network. The switch 60 may be a PABX which is further connected to the public switching network. The design of such digital switches is well known and will not be further described herein.

The interface circuits 55 may contain means for synchronizing the data rate to that of the digital switch. Thus although the instantaneous bit rate is variable because it is tied to the FM signal the rate at which data words are received or transmitted can be determined by clock information derived from the digital switch 60. The data received over the lines 61-1 to 61-n will include clock information which can be extracted by the interface circuit 55 and used to operate the data flag in the transmitter 3. This process can be repeated at the subscriber station and used to ensure that data transmitted from each subscriber station is synchronized. Low speed asynchronous data can be transmitted through the synchronous switch 60 by oversampling techniques.

It should be noted that the arrangement described is capable of transmitting a single video signal only from the switching network to an individual subscriber station and vice versa. If further video signals are required to be transmitted simultaneously this could be accomplished by frequency division multiplexing the further video signals provided that the transmission links have a sufficient bandwidth. This would require frequency division multiplexers and demultiplexers to be provided at the relevant subscriber stations 52-1 to 52-n and the corresponding input circuits 52-1 to 52-n of the central switching network.

If optical fibre is used as the transmission link then a plurality of frequency modulated signals can be transmitted using wavelength division multiplexing. Again appropriate multiplexing and demultiplexing equipment will be required for each subscriber.

The transmitter 3 provided in the input circuits will not require a VCO since the input signal from the selection switch 57 will already be in the form of a hard amplitude limited frequency modulated signal and consequently it can be applied directly to the inputs of the AND gate 304. Further since it is not desired to demodulate the FM signal at the central switching network but merely to strip the second information signal from it, the receiver output can be taken from the output of the OR gate 411. It is necessary at both the subscribers station and at the input circuit to ensure that the transmitter is provided with a carrier signal whether or not a first information signal is to be transmitted. Consequently, at a subscriber station the VCO should always be provided even if no first information signal is to be transmitted from that subscriber station. In this case, or during periods between transmission of first information signals the VCO would be set to its nominal, unmodulated, frequency. Further if it cannot be guaranteed that the switching network will always provide an FM input to the transmitter in the input circuit then a VCO must be provided in the transmitter together with an appropriate selection circuit to activate the VCO when no input FM signal is provided. It is necesary to provide the carrier signal in order that the second information signal can be transmitted regardless of whether the first information signal is present.

The lines 59-1 to 59-n and 61-1 to 61-n may comprise multiple conductors to suit the various data assembly packages, e.g. for the receiver shown in FIG. 8 a thirteen conductor line would be appropriate. Further if more than one wide band signal is transmitted to a single subscriber the lines 56-1 to 56-n and 58-1 to 58-n may comprise a corresponding number of conductors.

FIG. 11 shows in block schematic form a possible configuration for the selection and distribution switching network 57. The network in FIG. 11 caters for sixteen inputs 501-516 and sixteen outputs 517-532 but any number of inputs and outputs could be catered for by providing the appropriate number of switching matrices. The inputs 501-516 are connected in pairs to eight 2×2 switching matrices 533-540. First outputs of the 2×2 switching matrices 533-540 are connected to inputs of a first 8×8 switching matrix 541 while second outputs of the 2×2 switching matrices 533-540 are connected to inputs of a second 8×8 switching matrix 542. The outputs of the switching matrix 541 are connected individually to first inputs of eight 2×2 switching matrices 543-550 while the outputs of the switching matrix 542 are connected individually to second inputs of the switching matrices 543-550. The outputs of the switching matrices 543-546 are connected individually to respective inputs of an 8×8 distribution matrix 551 while the outputs of the switching matrices 547-550 are connected individually to respective inputs of an 8×8 distribution matrix 552. Terminals 553, 554, and 555 are connected to inputs 1, 2 and 3 of the distribution matrix 552 and through the matrix 552 to inputs 1, 2 and 3 of the distribution matrix 551. Second outputs of the 2×2 matrices 545 and 546 are connected to inputs 4 and 5, respectively, of distribution matrices 551 and 552 while first outputs of the 2×2 matrices 547 and 548 are connected to inputs 6 and 7, respectively of distribution matrices 551 and 552.

The 8×8 switching matrices 541 and 542 are constructed as shown in FIG. 12, the 8×8 distribution matrices 551 and 552 are constructed as shown in FIG. 13 and the 2×2 switching matrices 533-540 and 543-550 are constructed as shown in FIG. 14.

FIG. 12 is a circuit diagram of an 8×8 switching matrix suitable for use as the switching matrices 541 and 542. The switching matrix shown in FIG. 12 has eight input terminals 601 to 608 for connection to respective outputs of the 2×2 switching matrices 533-540. The input terminals 601 to 608 are connected to the data inputs of eight 8 input multiplexers 611 to 618, the terminals 601 to 608 being connected to the D0 to D7 inputs of each multiplexer. In the embodiment shown in the Figures the multiplexers 611-618 are each formed by a type 74HC151 integrated circuit. The outputs of the multiplexers 611 to 618 are connected to eight output terminals 621 and 628 of the switching matrix. The multiplexer 611 has four further inputs 631 to 634, three of which are used to select which input signal is switched through to the output and the other of which is an enable input which may be used to allow or prevent any signal from appearing at the output. Similarly and for the same purpose the multiplexer 612 has four further outputs 635 to 638, the multiplexer 613 has four further inputs 641 to 644, the multiplexer 614 has four further inputs 645 to 648, the multiplexer 615 has four further inputs 651 to 654, the multiplexer 616 has four further inputs 655 to 658, the multiplexer 617 has four further inputs 661 to 664, and the multiplexer 618 has four further inputs 665 to 668.

With the switching matrix arranged as shown in FIG. 12 any of the signals at any of the eight input terminals 601 to 608 can be switched to any of the eight outputs. In particular, it is possible to switch a single input to more than one output including the case where one input is switched to all eight outputs. Since the input signals at terminal 601 to 608 are hard limited all the information is carried in the timing of the transitions of the signals. Consequently, a simple logic gate may be used for switching the signals since the transitions between high and low logic levels will be faithfully reproduced at its output. In particular, the relative position in time of successive positive or negative going transitions of the input signal will be faithfully reproduced at the output and this is precisely the property of the frequency modulated signal which it is necessary to preserve during its passage through the switching network. The relative times of successive transitions will not necessarily be maintained as these will be dependent on the rise and fall times and the threshold voltages of the gates.

FIG. 13 is a circuit diagram of a distribution matrix suitable for use as the distribution matrices 551 and 552. The distribution matrix shown in FIG. 13 has eight input terminals 701 to 708 for connection to respective outputs of the 2×2 switching matrices 543-550. The input terminals 701 to 708 are connected to one input of a respective one of eight 8 input multiplexers 711 to 718, the terminals 701 to 708 being connected to the D7 input of each multiplexer. Seven further inputs 1 to 7 are connected to the other seven inputs of each of the multiplexers 711 to 718. In the embodiment shown in the Figures the multiplexers 711-718 are each formed by a type 74HC151 integrated circuit. The outputs of the multiplexers 711 to 718 are connected to eight output terminals 721 to 728 of the distribution matrix. The multiplexer 711 has four further inputs 731 to 734, three of which are used to select which input signal is switched through to the output and the other of which is an enable input which may be used to allow or prevent any signal from appearing at the output. Similarly and for the same purpose the multiplexer 712 has four further outputs 735 to 738, the multiplexer 713 has four further inputs 741 to 744, the multiplexer 714 has four further inputs 745 to 748, the multiplexer 715 has four further inputs 751 to 754, the multiplexer 716 has four further inputs 755 to 758, the multiplexer 717 has four further inputs 761 to 764, and the multiplexer 718 has four further inputs 765 to 768.

With the distribution matrix arranged as shown in FIG. 13 any of the signals at any of the seven input terminals 1 to 7 can be switched to any of the eight outputs. In particular, it is possible to switch a single input to more than one output including the case where one input is switched to all eight outputs. The input 701 to 708 can only be switched to the output of the multiplexer to whose input they are connected.

FIG. 14 shows a switching matrix having two inputs 801 and 802 and two outputs 803 and 804. The input 801 is connected to a first input of two NOR gates 805 and 806 while the input 802 is connected to a first input of two NOR gates 807 and 808. A first control input 809 is connected to a second input of NOR gates 805 and 808 while a second control input 810 is connected to a second input of NOR gates 806 and 807. The outputs of the NOR gates 805 and 807 are connected to respective inputs of an OR gate 811 whose output is fed to the output 803 of the switching matrix while the outputs of the NOR gates 806 and 808 are connected to respective inputs of an OR gate 812 whose output is fed to the outputs 804 of the switching matrix. If a logical '1' is connected to the control input 809 and a logical '0' to the control input 810, an inverted vesion of the signal present at input 801 will be produced at output 804 and the inverted version of the signal present at input 802 will be produced at output 803. When the control input 809 is fed with a logical '0' and the control input 810 is fed with a logical '1' then an inverted version of a signal present at input 801 will be produced at output 803 and an inverted version of a signal present at input 802 will be produced at output 804. It should be noted that with the arrangement shown in FIG. 14 it is not possible to connect one input to both outputs.

The selection and distribution switching network 57 shown in FIG. 11 uses the matrices shown in FIGS. 12, 13 and 14 and a control unit 560 which generates control signals which are fed over the paths 561, 562, 563 and 564 to control inputs of the respective matrices. The control unit 560 which may be microprocessor based may be arranged to make the switching network rearrangeable to take advantage of the structure described by Benes, V. E. in a paper entitled "Optional Rearrangeable Multistage Connecting Networks" and published in the Bell System Technical Journal, July 1964, at pages 1641 to 1656. Channels for television distribution services may be fed to inputs 1, 2 and 3 of the distribution matrices 551 and 552 while inputs 4,5,6 and 7 may be used for conference facilities. The selection switch couples the conference speakers to an output connected to one of the conference lines. Each speaker at the conference requires a conference line. The distribution matrix then connects all listeners to that conference line. The arrangement can be expanded by adding one or more columns of two 8×8 distribution matrices, each column adding seven lines which may be used for conference or television distribution. It should be noted that inputs which are in the position of line 0 are individually connected to the outputs of the preceding section to permit the coupling of that section to the desired output.

It should be noted that the distribution and conference facilities referred to in the preceding paragraph relate to the first information signal which frequency modulates the carrier and not the second information signal which produces the short and long pulses. The second information signal has been separated and fed to the digital switch.

The subscriber's station shown in FIG. 15 includes a transmitter 3 and a receiver 4. The transmitter 3 has a first input 10 for receiving a first information signal from a source 900, for example a video signal source such as a television camera. The transmitter has a second input 20 for receiving a second information signal. The second input 20 may be an arrangement of several inputs arranged to receive data from a number of sources 902, 904, 906 simultaneously over parallel lines. Thus source 902 may be a data terminal transmitting synchronous data at a relatively high rate, e.g. 1 MHz, while source 904 may be a low speed asynchronous data terminal and source 906 may be a telephone having a digitally encoded speech output. The transmitter is provided with an output 39 for connection to the line 53-n in the system shown in FIG. 10.

The receiver 4 has an input 30 for connection to the line 54-n in the system shown in FIG. 10, a first output 40 at which the first information signal becomes available and a second output 49 at which the second information signal becomes available. The first output 40 may be connected to a television display apparatus or a video phone receiver 901. The second output 49 is connected to a number of data terminals 903, 905, 907. Terminal 903 may be a high speed synchronous data terminal, while terminal 905 may be a low speed asynchronous data terminal and terminal 907 may be a telephone accepting digitally encoded speech signals. The receiver 4 includes a clock extraction circuit which provides a clock signal at an output 412 to enable synchronization of the data terminals 902 and 903 to the system clock generated in the digital switch and to enable, via input 300, data to be transmitted by the transmitter 3 to be synchronized.

The synchronous data terminals 902 and 903 have been shown as two units to illustrate more clearly the generation and reception of data but clearly both could be part of the same terminal having the capacity for two way communication. Similarly with the asynchronous terminals 904 and 905 and the telephone which comprises units 906 and 907. For video phone applications the camera and display may be built into a single unit. Thus in each case although the functions of each block illustrated are separate they are not necessarily separate constructional entities.

The transmitters shown in FIGS. 2 and 4 are suitable for transmitting a video signal plus a data signal which comprises a number of channels each of which operates at the same data rate.

FIG. 16 shows in block schematic form a transmitter which is capable of combining data channels operating at different rates. The transmitter shown in FIG. 16 has input 100 to which a video signal is applied. This input is connected to a pre-emphasis circuit 101 whose output is applied to a control input of a voltage controlled oscillator 102. This voltage controlled oscillator provides a frequency modulated output. The form of oscillator may be such as to produce a square wave output or if it produces a sine wave output this would then be followed by a limiting amplifier to give a square wave frequency modulated signal which is then applied an error protection unit 103. The error protection unit may be a monostable multivibrator having a maximum retriggerable rate of say 33 MHz. It therefore prevents the instantaneous clock rate exceeding the limits of the switching speed of the CMOS circuitry. With asynchronous switching of the square wave FM signals in the video switch the received square wave FM signals may contain two zero crossings spaced at less than the permitted minimum time interval. The output of the error protection unit which comprises the square wave FM signal is applied to a counter 104, to a flag detection circuit 105, to the clock input of a shift register 106 and to a pulse width modulator 107. The flag detection circuit 105 has a further input which is connected to an input terminal 120, on which an external flag signal is applied to indicate when data is available for applying to inputs of the shift register 106. The flag detection circuit 105 has a further input to which an output of the counter 104 is connected this output being the terminal count of the counter 104. The output of the flag detection circuit 105 is fed to enable input of the shift register 106 to cause the shift register to read in data from its parallel inputs. The flag detection circuit output is also connected to a preset input of the counter 104. The shift register 106 has five parallel inputs 108 to 112. The inputs 108 to 111 are available for the application data from external sources while the input 112 is connected to the serial output of a further shift register 113. The output of the counter 104 is fed to the clock input of the shift register 113 and also to a further counter 115 and a further flag detection circuit 114. The further flag detection circuit 114 also has further inputs connected to a terminal 121 on which a low frequency flag data flag signal is applied and to the terminal count output of the counter 115. The output of the flag detection circuit 114 is fed to a preset input of the counter 115 and to a preset input of the shift register 113 which causes the data applied to inputs 116, 117, 118, 119, 128 and 129 to be read in parallel into the shift register 113.

A further input 130 may be provided which takes the square wave FM signal from the switching network. In this case the video input 100, pre-emphasis circuit 101, and voltage controlled oscillator 102 may be omitted, provided that it can be ensured that a square wave frequency modulated signal is always available from the switching network.

The two tier system shown in FIG. 16 enables a number of high data rate channels to be multiplexed with a number of low data rate channels. For example, the flag signal applied to input 120 may operate at a frequency of 2.048 MHz to enable four high speed data channels to be provided. Lower speed data such as that for ISDN networks can be applied to the parallel inputs of shift register 113. Because of the uncertainty in the relative timing of the square wave FM signal and the data flag it is necessary to have a flag period which can accommodate eight data bits although only seven information bits are present in each flag period, i.e. a start and a stop bit and five data bits. Thus it is necessary that the square wave FM has a minimum frequency of at least 16.4 MHz. The clock applied to the shift register 113 is derived from the counter 104 and thus will cause a serial output bit from the shift register 113 to be applied to the input 112 of the shift register in each data flag field of the shift register 106. Thus it will take six high speed data flag periods to transfer the information from the shift register 113 to the shift register 106. In this way, six low speed data channels are assembled into a single high speed data channel which is then assembled into a single higher speed data channel for transmission through the pulse width modulator 107 to the output 131.

Thus the operation of the transmitter can be summarized as follows:

The data from the various independent parallel inputs is sampled and assembled into serial words using a shift register under the control of a counter and the data flag. The flag control includes a mechanism which operates with asynchronous arrival of flag and square wave frequency modulation signal. Words are released at intervals controlled by the data flags but determined by the square wave frequency modulation clock. The data is fed to the output pulse width modulator which generates either a long or a short pulse at each transition of the FM clock.

The receiver shown in FIG. 17 has an input 200 which applied to a line equalization circuit 201 whose output is fed to a decision circuit 202 and a pulse frequency modulation generator 203. The pulse frequency modulation generator, generates a constant width pulse at each positive going transition of the square wave frequency modulated signal. The output of the pulse frequency modulation generator is applied to a low pass filter 204 to produce a demodulated video signal, which is then passed through a de-emphasis circuit 205 and a video clamp 206 to an output 207 at which the video signal is available. When the receiver is used at the switching network the low pass filter 204, the de-emphasis circuit 205 and clamp 206 are omitted and instead the output of the pulse frequency modulation generator 203 is fed via a divide-by-two circuit to an output 208. This separates the long and short pulses from the transitions of the square wave frequency modulated signal and allows the square wave frequency modulated signal to be switched in the selection and distribution switching network 57. The leading edges of the pulses produced in the generator 203 are used to clock the decision circuit 202, a counter 209 and a shift register 210. The decision circuit 202 determines whether the leading edge of the square wave frequency modulated signal has initiated a short or a long pulse and provides an output which is a logical '0' or logical '1' dependent on the length of the pulses detected. These signals are fed to the serial input of the shift register 210. Successive logic states are shifted through the shift register 210 by the leading edges of the pulses from the generator 203 until the counter 209 reaches its terminal state. This then causes the data in the shift register 210 to be shifted in parallel into a latch 211. The four high speed data channel outputs are then available at outputs 212, 213, 214 and 215. The multiplexed low speed data is available at output 216 of the latch 211 and the output 216 of the latch 211 is connected to the serial input of a shift register 217. Further the output of counter 209 is fed to the clock input of the shift register 217, thus causing data to be read from the output 216 of the latch into the shift register 217 at the rate at which it appears at the output 216 of the latch 211. The output of counter 209 is also fed to the input of a counter 218 whose terminal count output is connected to a latch 219. Thus when the shift register 217 has been filled the latch 219 will take the parallel information from the shift register 217 and provide outputs at outputs 220, 221, 222, 223, 224 and 225. This provides six low speed data channels. The outputs of counter 209 and 218 may be connected to respective clock extraction circuits 226 and 227, these will include voltage controlled oscillators in phase locked loops to provide the high speed data flag signal and the low speed data flag signal for use in the terminals or synchronous switch 60.

Thus there is disclosed a receiver which is capable of separating the square wave frequency modulated signal from the pulse width modulated signals and which is capable of giving a video output and a plurality of channels of high speed and low speed data. This receiver is suitable for use either at the switching network or at the subscriber ends of the lines. The differences in constructions being the minimal ones of either producing the video demodulation circuit which is necessary at the subscriber end or providing the square wave frequency modulation signals separate from the data signals which is required at the swiching network.

FIG. 18 shows in greater detail a modified transmitter which is capable of transmitting combined high and low speed data channels and which includes an error protection circuit and a modified clock circuit. Elements in FIG. 18 which correspond to the elements in FIG. 4 have been given the same reference numerals. The transmitter shown in FIG. 18 operates in substantially the same manner as that shown in FIG. 4 and consequently only the differences between these two arrangements will be described. Two inputs 350 and 351 which are fed to clock inputs of two D-type bistable circuits 352 and 353 are fed with the square wave frequency modulated signal and an inverted version thereof. The $\overline{Q}$ outputs of the bistable 352 and 353 are fed to respective inputs of an AND-gate 354 which is fed to the reset input of a bistable 355. The Q output of the bistable 355 is fed to a first input of a NOR-gate 356 whose output is fed to the inputs of a NOR-gate 357 and to the clock input of the bistable 355. The output of the NOR gate 357 is fed to the input of a NOR gate 358 whose output is fed to a second input of the NOR gate 356. The circuit formed by the bistable 355 and the NOR gates 356, 357 and 358 forms a monostable circuit which is retriggerable only after a set period and which is arranged so that it gives an output on its $\overline{Q}$ output only when the transitions of the square wave frequency modulated signal are separated by a given time.

There are two data flag inputs 300 and 3001 the data flag input 300 is fed through an AND gate 359 to the data flag detection circuit which takes the same form as that shown in FIG. 4. The data flag input 3001 is the low speed data flag and again feeds a data flag detection circuit which is of the same form as that shown in FIG. 4. In FIG. 18 the suffix 1 has been added to the reference numbers for that part of the circuit which is concerned with the low speed data. The shift register clock for the low speed data is derived from the counter 315 and comprises the terminal count of the counter 315 which is fed to the clock input of the bistable 3051 via an inverter 320. The data input 20 includes a connection from the Q3 output of shift register 3131 which is connected to the D1 input of shift register 313. Thus as each bit is shifted serially out of shift register 313 it is applied to the parallel input D1 of shift register 313. Since this is shifted by a clock which is derived from the terminal count of counter 315 this is in synchronism with the application of data to the shift registers 310 and 313. Thus the inoput 20 provides four high speed data channel inputs plus a fifth high speed data channel which receives as its input the multiplexed low speed data channels which are applied to the input 201. The output of the AND gate 327 at terminal 360 is applied to a similar driver circuit to that shown in FIG. 4.

The complete separation of all the services at the switching network interfaces permits the optimum switching equipment to be employed for each service. Existing digital data and voice networks can be incorporated when this broadband link is installed. The ability to pass network synchronization clocks through the links is an important advantage in this context. For an integrated services network the provision of a common control of all switching equipments and terminal equipments is necessary. The link have adequate capacity to provide dedicated control data channels between control centres or alternatively the D channel of the ISDN network may be employed.

A method of combining digital data services and a video service in square wave FM format for transmission as a binary signal has been disclosed. The system may be implemented in 74HC CMOS technology. CMOS is advancing rapidly and much greater flexibility in choice of system parameters will become available for a modest increase in maximum clock rate. The system described and implemented in 74HC provides a data capacity of 10 MB/s which can be allocated as required. The example given illustrates its potential use for the transmission of synchronous data from a 2 MB/s network as well as 64 kB/s and asynchronous data services. The ability to pass network clocks through the link is an important advantage.

The video signal in square wave FM format may be switched in asynchronous broadband space switches which can be produced with existing technology. Terminal equipment required to convert to analog signals is simple and permits full bandwidth services to be offered with consumer grade video equipment. All these features can result in significant economic benefits.

Business networks, characterized by a high density of short links, can be constructed with coaxial cable. With the reduction in cost of optical components longer links become economic. With advances in techniques such as wavelength division multiplexing extra video channels may be added and a single fibre may be used for two-way operation.

The quasi-digital techniques used in the system keep the required operation speeds within the capability of CMOS technology. Implementation of the system modules as purpose made integrated circuits could be achieved and will enable the provision of economic systems.

We claim:

1. A communication system comprising a plurality of subscriber stations and means for transmitting signals to and/or from each of the subscriber stations to a switching network for interconnecting the subscriber stations, wherein each subscriber station comprises a transmitter and/or a receiver, characterized in that each transmitter comprises means for frequency modulating a carrier signal by a first information signal and means amplitude limiting the frequency modulated carrier signal so that the information content of the frequency modulated signal is contained solely in the transition times of the frequency modulated carrier signal and means for further modulating the frequency modulated carrier signal by a second information signal the further modulation comprising a train of pulses the duration of individual pulses of the pulse train being dependent on the second information signal and the start of each pulse being coincident with a transition of said frequency modulated carrier signal, that each receiver comprises means for demodulating the frequency modulated carrier signal to recover the first information signal and means for demodulating the further modulation to recover the second information signal, and that the switching network comprises input means for receiving the signal from each of the subscriber stations and separating the first and the second information signals, the separating means having a first output for a second information signal and the second output for the square wave frequency modulated signal with the further modulation removed, means for connecting the first output of the separating means to a synchronous digital switching network, means for connecting the second output of the separating means to a selection or selection and distribution switching network and output means for combining the square wave frequency modulated signal and the second information signal, the combining means having a first input for receiving the square wave frequency modulated signal from the selection or selection and distribution network, a second input for receiving the second information signal and an output at which the square wave frequency modulated signal further modulated by the second information signal is produced.

2. A system as claimed in claim 1, in which the first information signal is a wideband analog signal.

3. A system as claimed in claim 2, in which the wideband analogue signal is a video signal.

4. A system as claimed in any preceding claim, in which the second information signal is a binary data signal, one state of which causes a short pulse to be generated and the other state of which causes a long pulse to be generated, the leading edges of the short and long pulses coinciding with transitions of the frequency modulated signal.

5. A system as claimed in claim 4, in which one or more transmitters comprise means for assembling data into n-bit data words for transmission, where n is a integer.

6. A system as claimed in claim 5, in which each bit of data word is derived from a different data source.

7. A system as claimed in claim 6, in which one bit of a data word is derived from a further data word assembled from a plurality of data sources operating at a lower clock speed.

8. A system as claimed in any one of claims 1–3, in which the input means comprises means for producing a square wave signal whose transitions correspond to the leading edges of the received pulse trains, means for feeding the square wave signal to the second output of the input means, means for demodulating the further modulation to recover the second information signal and means for feeding the second information signal to the first output of the input means.

9. A system as claimed in claim 8, in which the input means further comprises means for deriving a clock signal from the received pulse train.

10. A system as claimed in any one of claims 1-3, in which the output means comprises means for initiating a pulse at each transition of the square wave frequency modulated signal received at its first input, the length of the pulse being dependent on the state of the data signal applied to its second input, and means for feeding the combined signal to the output of the output means.

* * * * *

UNITED STATES PATENT AND TRADEMARK OFFICE
CERTIFICATE OF CORRECTION

PATENT NO. : 4,723,237
DATED : February 2, 1988
INVENTOR(S) : Derek Andrew et al It is certified that error appears in the above-identified patent and that said Letters Patent is hereby corrected as shown below:

IN THE CLAIMS

Claim 8, line 4, change "trains," to --train,--.

Signed and Sealed this

Twenty-first Day of March, 1989

Attest:

DONALD J. QUIGG

*Attesting Officer*           *Commissioner of Patents and Trademarks*

UNITED STATES PATENT AND TRADEMARK OFFICE
CERTIFICATE OF CORRECTION

PATENT NO. : 4,723,237

DATED : February 2, 1988

INVENTOR(S) : DEREK ANDREW ET AL

It is certified that error appears in the above-identified patent and that said Letters Patent is hereby corrected as shown below:

Claim 1, line 28   Change "the" first occurrence to --a--

Signed and Sealed this

Thirteenth Day of June, 1989

Attest:

DONALD J. QUIGG

Attesting Officer   Commissioner of Patents and Trademarks